United States Patent
Kasilya Sudarsan et al.

(10) Patent No.: US 11,908,225 B2
(45) Date of Patent: Feb. 20, 2024

(54) ULTRASONIC SENSING

(71) Applicant: QUALCOMM Incorporated, San Diego, CA (US)

(72) Inventors: Vishnu Vardhan Kasilya Sudarsan, Bangalore (IN); Sumeet Kumar Sahu, Berhampur (IN); Naga Chandan Babu Gudivada, Hyderabad, IN (US); Rakesh Pallerla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/002,048

(22) PCT Filed: Jul. 2, 2021

(86) PCT No.: PCT/US2021/040355
§ 371 (c)(1),
(2) Date: Dec. 15, 2022

(87) PCT Pub. No.: WO2022/010800
PCT Pub. Date: Jan. 13, 2022

(65) Prior Publication Data
US 2023/0290176 A1 Sep. 14, 2023

(30) Foreign Application Priority Data
Jul. 9, 2020 (IN) .............................. 202041029245

(51) Int. Cl.
*G06V 40/13* (2022.01)
*G06F 3/041* (2006.01)
*G06V 40/12* (2022.01)
*G06F 3/043* (2006.01)

(52) U.S. Cl.
CPC .......... *G06V 40/1306* (2022.01); *G06F 3/043* (2013.01); *G06F 3/04166* (2019.05); *G06V 40/1365* (2022.01)

(58) Field of Classification Search
CPC ............ G06V 40/1306; G06V 40/1365; G06F 3/04166; G06F 3/043
See application file for complete search history.

(56) References Cited

U.S. PATENT DOCUMENTS

| 2006/0097991 A1* | 5/2006 | Hotelling | ............ G06F 3/04166 345/173 |
| 2013/0215049 A1* | 8/2013 | Lee | ........................ G06F 3/041 345/173 |
| 2016/0299556 A1 | 10/2016 | Jueng et al. | |

(Continued)

OTHER PUBLICATIONS

International Search Report and Written Opinion—PCT/US2021/040355—ISA/EPO—dated Oct. 22, 2021.

*Primary Examiner* — Premal R Patel
(74) *Attorney, Agent, or Firm* — QUALCOMM Incorporated

(57) ABSTRACT

In one example, a method comprises: receiving an indication that an object is within a distance from an array of ultrasonic transducers; based on the indication, configuring a subset of the array of ultrasonic transducers to perform an ultrasonic sensing operation on the object; obtaining, from the subset of the array of ultrasonic transducers, an output of the ultrasonic sensing operation; and performing an action based on the output of the ultrasonic sensing operation.

20 Claims, 14 Drawing Sheets

(56) References Cited

U.S. PATENT DOCUMENTS

| | | |
|---|---|---|
| 2017/0330012 A1 | 11/2017 | Salvia et al. |
| 2019/0265831 A1* | 8/2019 | Sinnott ............... G06F 3/04883 |
| 2021/0286060 A1* | 9/2021 | Jennings ............ G06V 40/1306 |

* cited by examiner

ULTRASONIC SENSING

TECHNICAL FIELD

This disclosure relates to ultrasonic sensing, and more particularly to techniques to perform power-efficient ultrasonic sensing.

DESCRIPTION OF THE RELATED TECHNOLOGY

Electronic devices such as smart phones, tablets, or "Internet of Things" (IoT) devices and appliances can be made more functional by equipping them with sensors to provide convenient ways of inputting information. One example of those sensors is a biometric sensor, such as a finger-print sensor, which allows the electronic device to perform automated authentication of a user without the user manually inputting a password, a username, or other credential information.

A biometric sensor can be implemented based on an ultrasonic sensor system comprising an ultrasonic transmitter and an ultrasonic receiver. The ultrasonic transmitter may send an ultrasonic wave towards a finger. Fingerprint ridges, valleys between adjacent ridges, etc., may reflect the ultrasonic wave with different intensities back towards the ultrasonic sensor. A distribution of reflected signal strengths can be obtained to produce an image of the fingerprint. The image can then be compared with a reference fingerprint image of the user to authenticate the user.

However, an ultrasonic sensor system can be power inefficient, especially when it is integrated with the display screen of an electronic device. Thus, improved ultrasonic sensing techniques that can provide higher power efficiency are desirable.

BRIEF SUMMARY

An example method, according to this disclosure, comprises receiving an indication that an object is within a distance from an array of ultrasonic transducers. The method also comprises, based on the indication, configuring a subset of the array of ultrasonic transducers to perform an ultrasonic sensing operation on the object. The method also comprises obtaining, from the subset of the array of ultrasonic transducers, an output of the ultrasonic sensing operation. The method also comprises performing an action based on the output of the ultrasonic sensing operation.

An example apparatus, according to this disclosure, comprises a memory that stores a set of instructions. The apparatus further comprises a hardware processor configured to execute the set of instructions to receive an indication that an object is within a distance from an array of ultrasonic transducers. The hardware processor is further configured to execute the set of instructions to, based on the indication, configure a subset of the array of ultrasonic transducers to perform an ultrasonic sensing operation on the object. The hardware processor is further configured to execute the set of instructions to obtain, from the subset of the array of ultrasonic transducers, an output of the ultrasonic sensing operation. The hardware processor is further configured to execute the set of instructions to perform an action based on the output of the ultrasonic sensing operation.

An example non-transitory computer readable medium storing a set of instructions that, when executed by a hardware processor, causes the hardware processor to receive an indication that an object is within a distance from an array of ultrasonic transducers. The set of instructions, when executed by a hardware processor, further causes the hardware processor to, based on the indication, configure a subset of the array of ultrasonic transducers to perform an ultrasonic sensing operation on the object. The set of instructions, when executed by a hardware processor, further causes the hardware processor to obtain, from the subset of the array of ultrasonic transducers, an output of the ultrasonic sensing operation. The set of instructions, when executed by a hardware processor, further causes the hardware processor to perform an action based on the output of the ultrasonic sensing operation.

An example apparatus, according to this disclosure, comprises means for receiving an indication that an object is within a distance from an array of ultrasonic transducers. The apparatus further comprises means for, based on the indication, configuring a subset of the array of ultrasonic transducers to perform an ultrasonic sensing operation on the object. The apparatus further comprises means for obtaining, from the subset of the array of ultrasonic transducers, an output of the ultrasonic sensing operation. The apparatus further comprises means for performing an action based on the output of the ultrasonic sensing operation.

BRIEF DESCRIPTION OF THE DRAWINGS

Details of one or more implementations of the subject matter described in this specification are set forth in this disclosure and the accompanying drawings. Other features, aspects, and advantages will become apparent from a review of the disclosure. Note that the relative dimensions of the drawings and other diagrams of this disclosure may not be drawn to scale. The sizes, thicknesses, arrangements, materials, etc., shown and described in this disclosure are made only by way of example and should not be construed as limiting. Like reference numbers and designations in the various drawings indicate like elements.

DETAILED DESCRIPTION

Figure 1A:
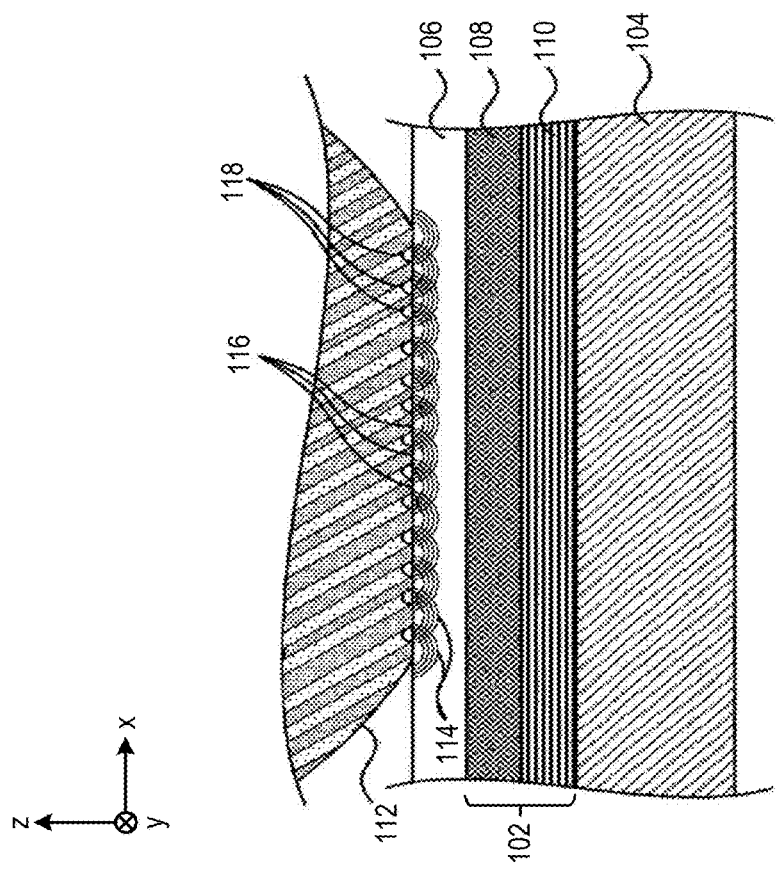
FIG. 1A, FIG. 1B, and FIG. 1C illustrate an example of an ultrasonic sensing system and its applications according to some implementations.
Figure 1A:
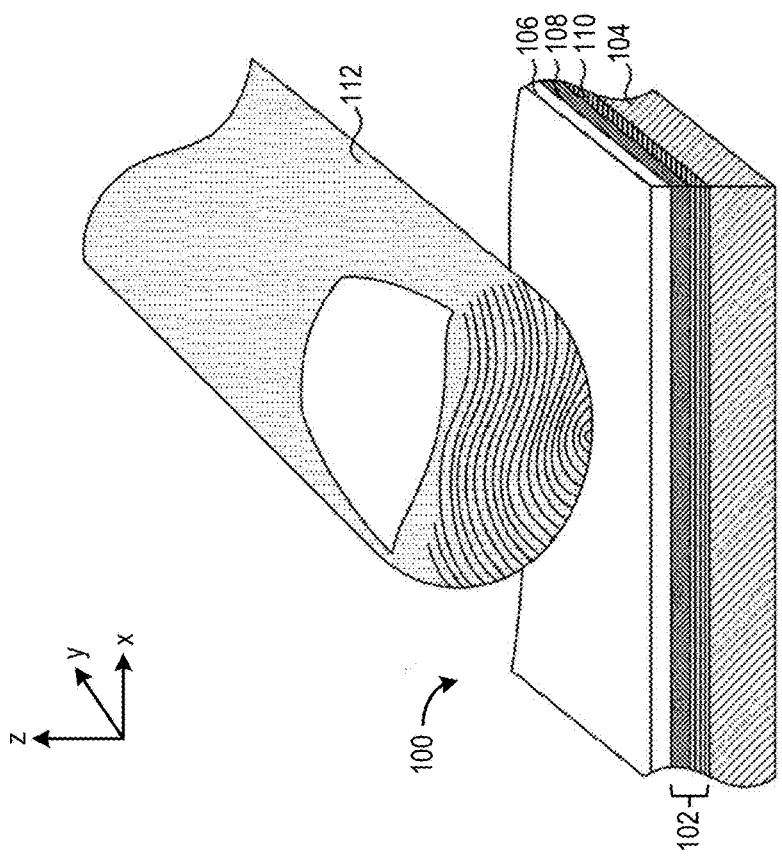

Aspects of the present disclosure relate to improvements to power efficiency of ultrasonic sensor systems integrated with display screens. Traditionally, the sensor area of an ultrasonic sensor system is separated from the display area of an electronic device. To reduce the footprint and/or to increase the display screen size of the electronic device, an ultrasonic sensor system can be integrated with the display to form part of a touch display interface. The ultrasonic sensor system can transmit ultrasonic waves over the entire display screen area to detect and to image the user's finger. Such an arrangement, however, is often power inefficient, as the user's finger only overlaps with a small portion of display screen and only reflects a small portion of the ultrasonic waves transmitted by the ultrasonic sensor system, while a large quantity of power is wasted in generating and transmitting ultrasonic waves that are not reflected by the user's finger and not involved in the imaging of the user's fingerprint.

According to aspects of the present disclosure, a subset of an array of ultrasonic transducers are used to perform an ultrasonic sensing operation, based on an indication that an object, such as a user's finger, is in proximity to the array of ultrasonic transducers. The indication may correspond, for instance, to the object being within a certain distance from the array of ultrasonic transducers and may be received, for instance, from a capacitive sensor module. One or more ultrasonic transducers within the array but not part of the subset of ultrasonic transducers may be disabled or operated at a reduced power level, thereby reducing the overall energy consumption of the ultrasonic sensor system.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a millimeter band communications capability. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands and patches, etc., Bluetooth® devices, personal data assistants (PDAs), wireless electronic mail receivers, hand-held or portable computers, netbooks, notebooks, smart books, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, steering wheels, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automated teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Details of one or more implementations of the subject matter described in this specification are set forth in this disclosure, which includes the description and claims in this document and the accompanying drawings. Other features, aspects and advantages will become apparent from a review of the disclosure. Note that the relative dimensions of the drawings and other diagrams of this disclosure may not be drawn to scale. The sizes, thicknesses, arrangements, materials, etc., shown and described in this disclosure are made only by way of example and should not be construed as limiting.

The systems, methods and devices of the disclosure each have several innovative aspects, no single one of which is solely responsible for the desirable attributes disclosed herein.

Figure 1B:
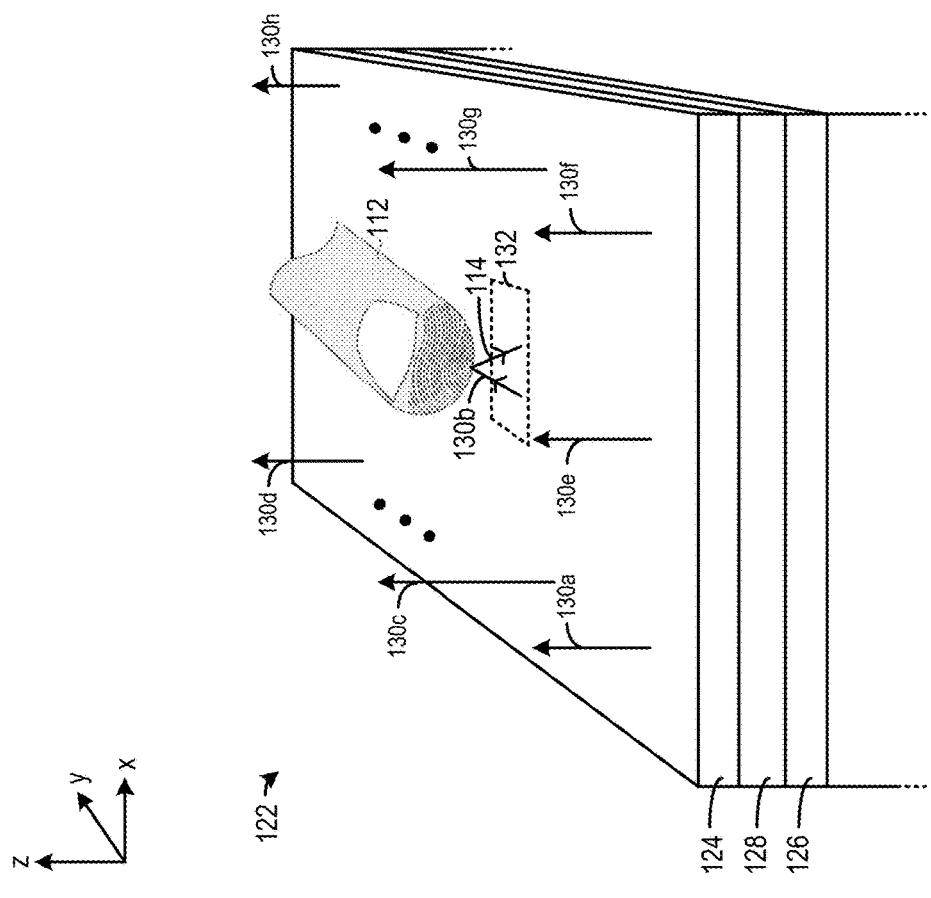
Figure 1B:
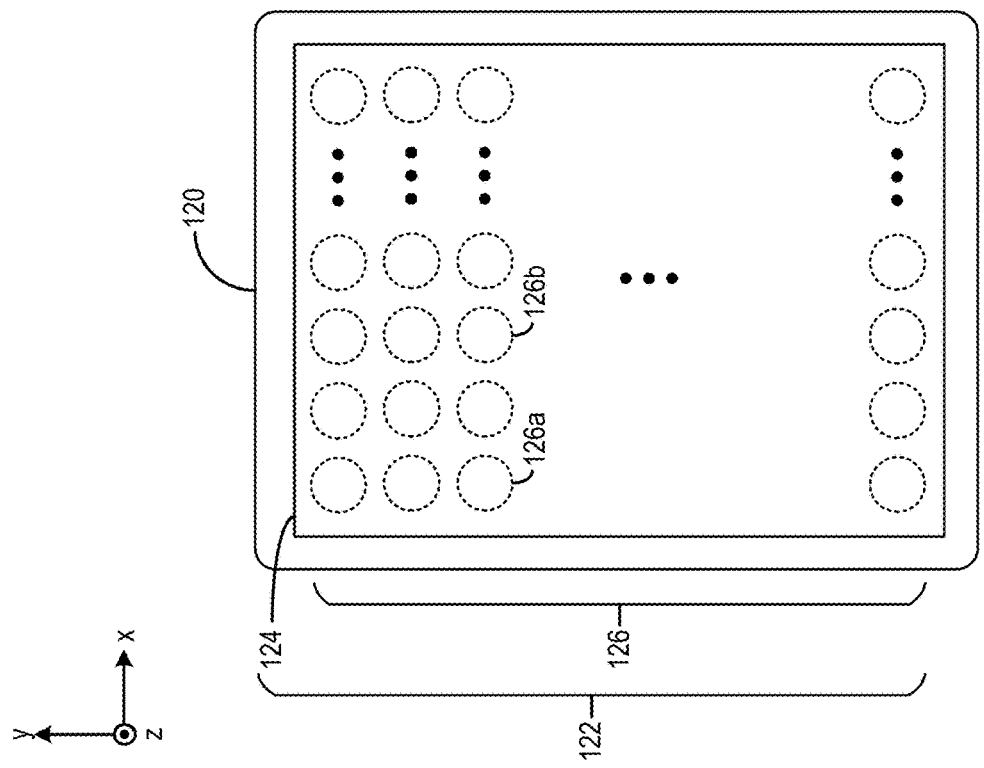

FIG. 1A illustrates an example ultrasonic sensing system 100. The left diagram of FIG. 1A illustrates a perspective view of ultrasonic sensing system 100, while the right diagram of FIG. 1B illustrates a cross-sectional side view of the ultrasonic sensing system. Ultrasonic sensing system 100 may include an ultrasonic transducer 102 that overlies a substrate 104, both of which underlie a platen (e.g., a "cover plate" or "cover glass") 106 to form a stack along an axis (e.g., z-axis) perpendicular to the plane of platen 106 (e.g., x-y plane). Ultrasonic transducer 102 may include both an ultrasonic transmitter 108 and an ultrasonic receiver 110.

Ultrasonic transmitter 108 can be configured to generate and transmit ultrasonic waves towards platen 106, and in the illustrated implementation, towards a human finger portion 112 positioned on the upper surface of platen 106. In some examples, ultrasonic transmitter 108 can be configured to generate and transmit ultrasonic plane waves towards platen 106. Ultrasonic transmitter 108 may include a piezoelectric material to convert electrical signals provided by a controller of the ultrasonic sensing system into a continuous or pulsed sequence of ultrasonic plane waves at a scanning frequency. In some examples, as shown in FIG. 1A, ultrasonic transmitter 108 includes a layer of piezoelectric material such as, for example, polyvinylidene fluoride (PVDF) or a PVDF copolymer such as PVDF-TrFE. In some examples, other piezoelectric materials may be used in the ultrasonic transmitter 108 and/or the ultrasonic receiver 110, such as aluminum nitride (AlN) or lead zirconate titanate (PZT). In some implementations, the ultrasonic transmitter 108 and/or ultrasonic receiver 110 may additionally or alternatively include capacitive ultrasonic devices such as capacitive micro machined ultrasonic transducers (CMUTs) or piezoelectric ultrasonic devices such as piezoelectric micro machined ultrasonic transducers (PMUTs, also referred to as "piezoelectric micromechanical ultrasonic transducers").

In addition, ultrasonic receiver 110 can be configured to detect ultrasonic reflections 114 resulting from interactions of the ultrasonic waves transmitted by the ultrasonic transmitter 108 with ridges 116 and valleys 118 defining the fingerprint of the finger portion 112 being scanned. In some examples, as shown in FIG. 1A and FIG. 1B, ultrasonic transmitter 108 can be positioned between platen 106 and ultrasonic receiver 110, whereas in some examples ultrasonic receiver 110 can be positioned between platen 106 and ultrasonic receiver 108. In some examples, ultrasonic receiver 110 may include a second piezoelectric layer different from the piezoelectric layer of the ultrasonic transmitter 108. For example, the piezoelectric material of the ultrasonic receiver 310 may be any suitable piezoelectric material such as, for example, a layer of PVDF or a PVDF-TrFE copolymer. The piezoelectric layer of ultrasonic receiver 110 may convert vibrations caused by the ultrasonic reflections into electrical output signals. In some implementations, ultrasonic receiver 110 further includes a thin-film transistor (TFT) layer. In some such implementations, the TFT layer may include circuits configured to amplify or buffer the electrical output signals generated by the piezoelectric layer of ultrasonic receiver 110.

Ridges 116 and valleys 118 can reflect the ultrasonic wave with different intensities back towards the ultrasonic sensor, which can create a distribution of signal strengths of ultrasonic reflections 114. The TFT circuits can generate electrical output signals reflecting the distribution, and the electrical output signals can be used to create an image of the fingerprint represented by ridges 116 and valleys 118.

Ultrasonic sensing system 100 can be integrated with an electronic device, such as a smart phones, a tablet, etc., to provide an input interface. In some examples, ultrasonic sensing system 100 can be configured as an biometric sensor system to collect biometric information, such as fingerprint information, to authenticate a user who seeks to access certain functions of the electronic device. The collection of the fingerprint information can be performed in lieu of (or in addition to) requiring the user to manually input a password or other credential information. For example, referring back to FIG. 1A, ultrasonic sensing system 100 can perform an ultrasonic sensing operation to capture an image of a fingerprint of a user who seeks to access the electronic device. The image can then be compared with a reference fingerprint image to authenticate the user. Upon authenticating the user, the user can then be provided with access to those functions of the electronic device.

To reduce the footprint and/or to increase the display screen size of the electronic device, ultrasonic sensor system 100 can be integrated with the display to form a touch display interface. FIG. 1B illustrates an example of an electronic device 120 having a touch display interface 122 with an integrated ultrasonic sensor system 100. The left diagram illustrates a top view of electronic device 120, while the right diagram illustrates a perspective view of display interface 122. As shown in FIG. 1B, touch display interface 122 can include a display screen 124 which can be part of or include platen 106, and an array of ultrasonic transducers 126, such as ultrasonic transducers 126a and 126b, which is part of ultrasonic sensing system 100. Array of ultrasonic transducers 126 can be arranged in a two-dimensional grid below the entirety of display screen 124.

Referring to the right diagram of FIG. 1B, display screen 124, a layer of display pixels circuit 128 and array of ultrasonic transducers 126 can be stacked to form touch display interface 122. Display screen 124 can transmit content output by display pixels circuit 128. In addition, each ultrasonic transducer of array of ultrasonic transducers 126 can transmit an ultrasonic wave, such as ultrasonic wave 130a, 130b, 130c, 130d, 130e, 130f, 130g, etc., through display screen 124, such that ultrasonic waves 130 are transmitted over the entire display screen area to detect and to image the user's finger. In FIG. 1B, the finger portion 112 having ridges 116 and valleys 118 is positioned over a region 132 of display screen 124 that overlaps with one or more ultrasonic transducers 126, which can transmit ultrasonic wave 130b. Finger portion 112 can reflect ultrasonic wave 130b back to transducer 126b as reflected wave 114, which can be detected by transducer 126b.

Figure 1C:
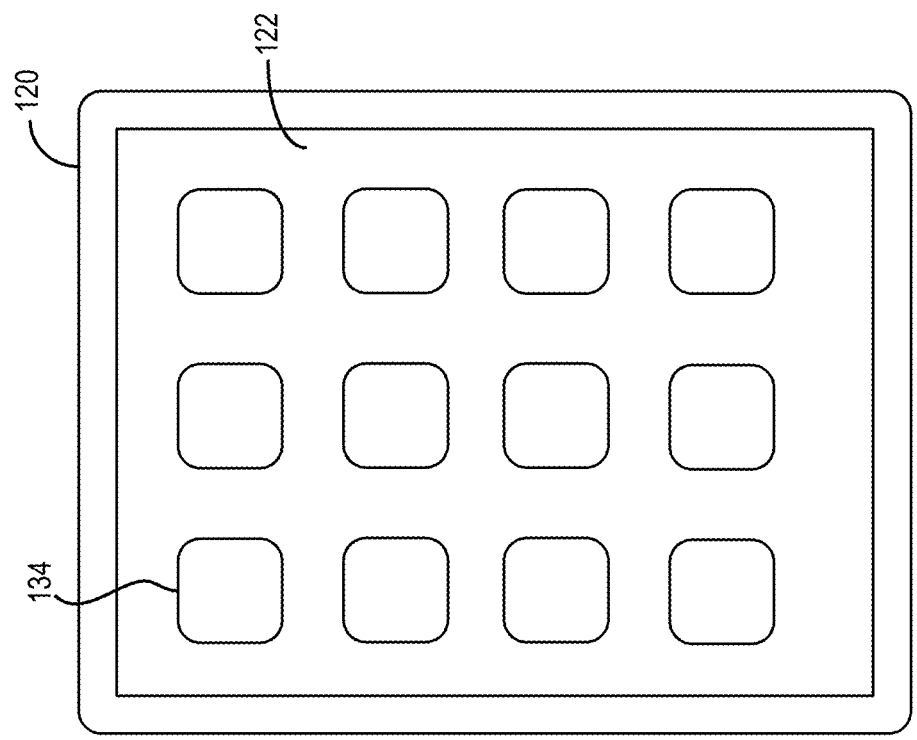
Figure 1C:
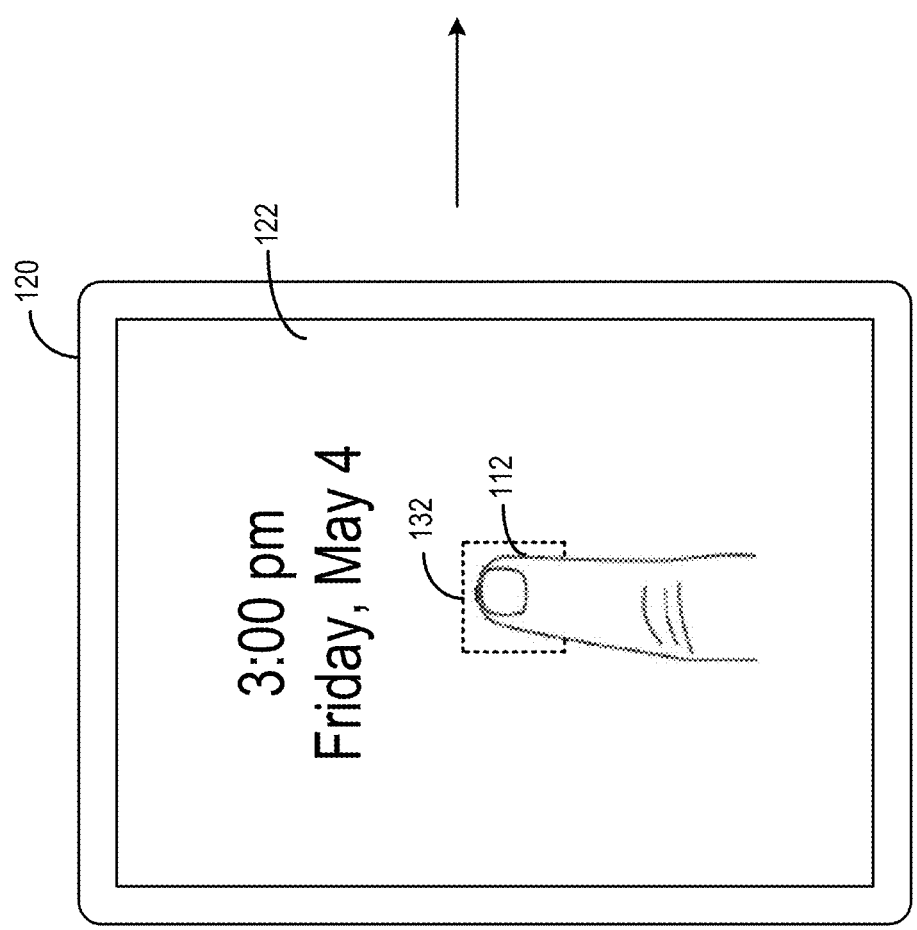

FIG. 1C illustrates an example application of touch display interface 122. In FIG. 1C, electronic device 120 can be initially in a lock state in which touch display interface 122 displays a locked screen showing, for example, the current time and date. A user can put his/her finger at any position on display screen 124, such as region 132. The one or more ultrasonic transducers 126 under region 132 can detect and image the fingerprint of finger portion 112. Upon authenticating the user based on the fingerprint image, electronic device 120 can transition to an active state in which touch display interface 122 displays an active screen including icons 134 which can be selected by the user to access one or more applications.

The arrangements of FIG. 1A-FIG. 1C provide a touch display interface integrated with an ultrasonic sensing system, which can do away with a separate ultrasonic sensing interface and thus can reduce the footprint and/or increase the available display screen size of electronic device 120. But ultrasonic sensing system 100 of FIG. 1A-FIG. 1C can be power inefficient. Specifically, referring back to FIG. 1B, finger portion 112 only overlaps with a small portion of display screen 124 (e.g., region 132) and reflects only a small portion of the ultrasonic waves 130 transmitted by array of ultrasonic transducers 126 (e.g., ultrasonic wave 130b), while a large quantity of power is wasted in generating and transmitting ultrasonic waves that are not reflected by the user's finger and not involved in the imaging of the user's fingerprint (e.g., ultrasonic waves 130a and 130c-h).

Figure 2A:
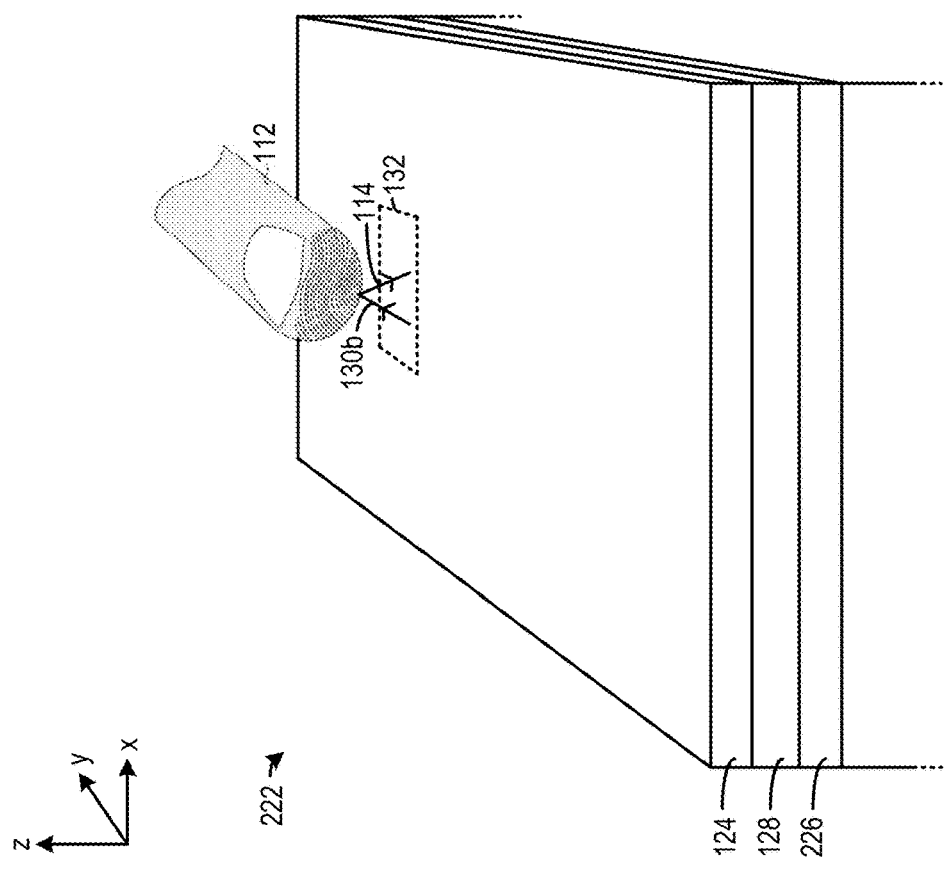
FIG. 2A and FIG. 2B illustrate another example of an ultrasonic sensing system and a focused ultrasonic sensing operation performed by the sensing system, according to examples of the present disclosure.
Figure 2A:
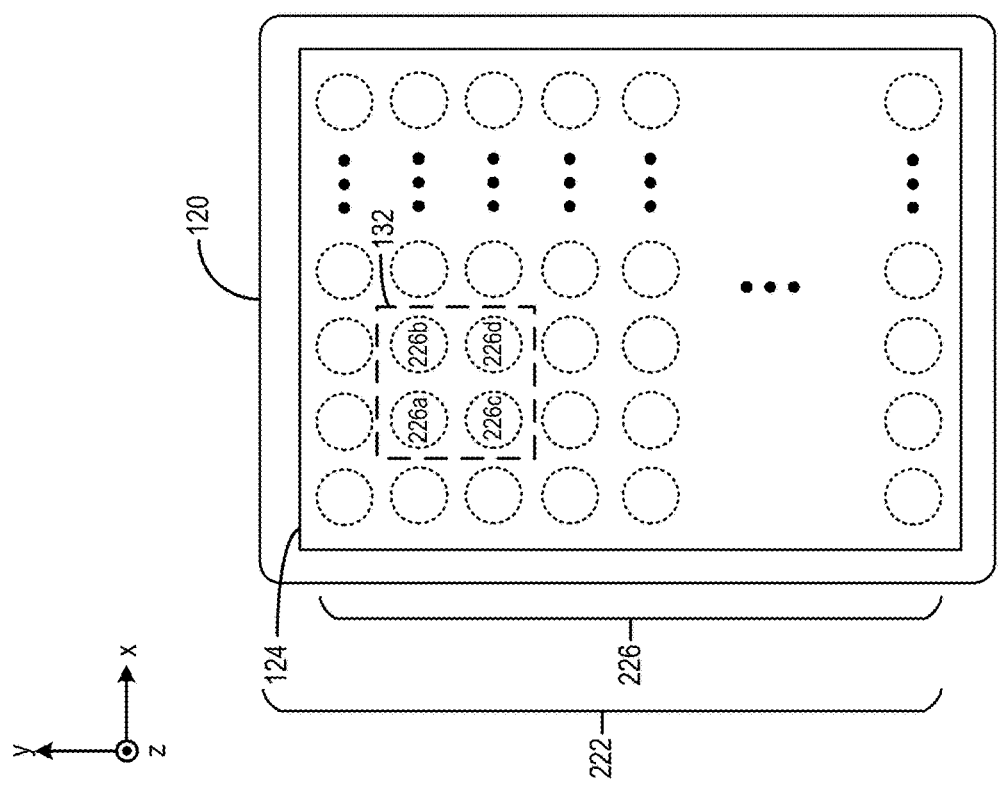
Figure 2B:
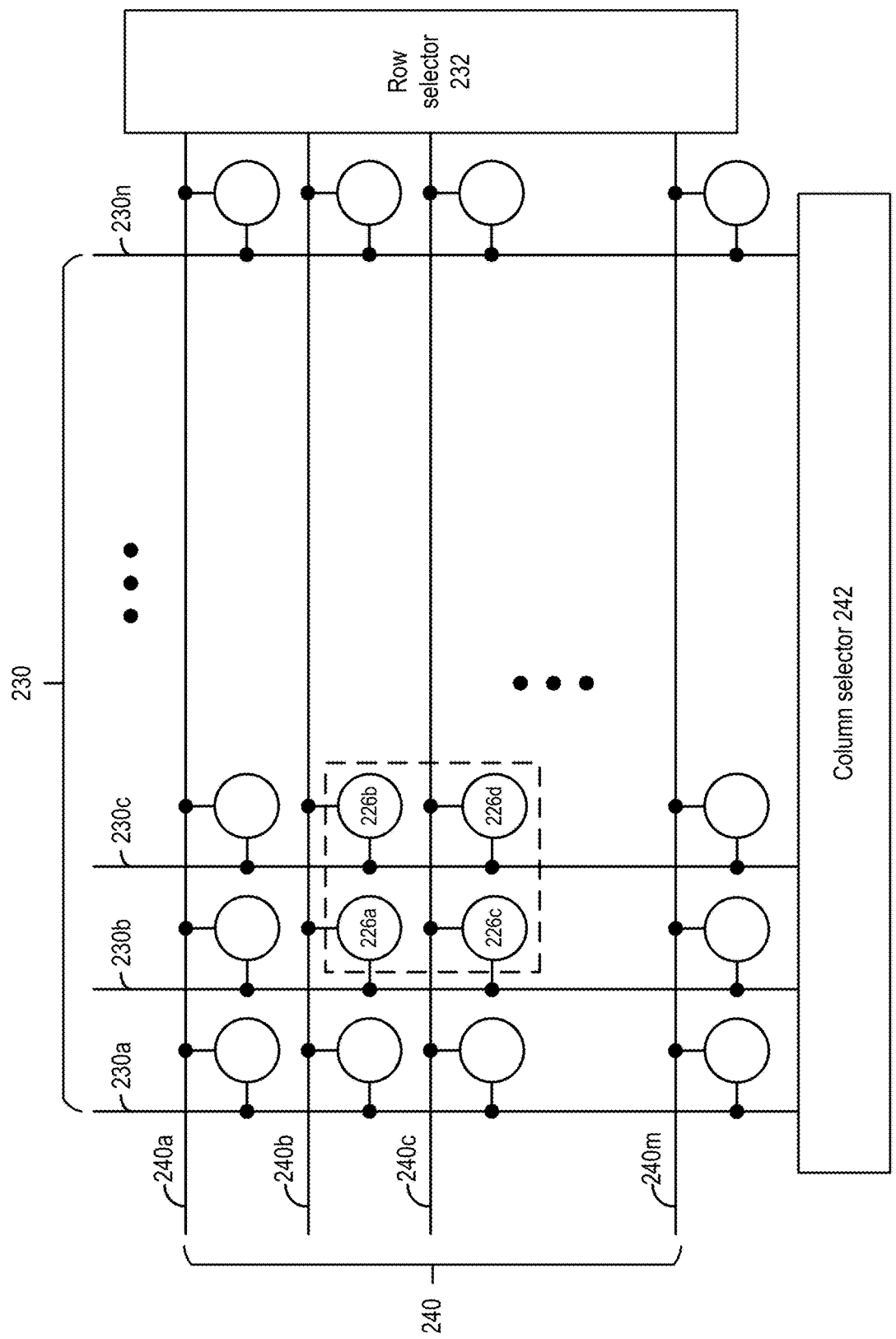

FIG. 2A and FIG. 2B illustrates a touch display interface 222 that can provide improved power efficiency. As shown in FIG. 2A, touch display interface 222 can include display screen 124 which can be part of or include platen 106 and an array of ultrasonic transducers 226. Array of ultrasonic transducers 226 can be arranged in a two-dimensional grid that under the entirety of display screen 124. In addition, each ultrasonic transducer of array of ultrasonic transducers 226 can be individually addressable and controllable. Specifically, referring to FIG. 2B, array of ultrasonic transducers 226 can include a set of row buses 230 (e.g., 230a, 230b, 230c, 230n, etc.) each driven by a row selector 232, and a set of column buses 240 (e.g., 240a, 240b, 240c, 240m, etc.) each driven by a column selector 242. Each ultrasonic transducer can be coupled with a row bus 230 and a column bus 240. Through a combination of row selection signals on row buses 230 provided by row selector 232 and column selection signals on column buses 240 provided by column selector 242, a subset of array of ultrasonic transducers 226 can be selected to transmit ultrasonic waves and to detect reflected ultrasonic waves. For example, by transmitting row selection signals on row buses 240b and 240c, and column selection signals on column buses 230b and 230c, a subset of array of ultrasonic transducers 226 including ultrasonic transducers 226a-226d can be selected.

The subset of array of ultrasonic transducers 226 can be selected to perform a focused detection operation, based on those ultrasonic transducers being located under a region of display screen 124 that overlaps with finger portion 112. For example, referring back to FIG. 2A, only the subset of ultrasonic transducers 226 under region 132 (the region where finger portion 112 overlaps/touches display screen 124) is enabled to transmit ultrasonic wave 130 to finger portion 112. In FIG. 2A, ultrasonic transducers 226a-226d can be enabled as they are under region 132. On the other hand, the rest of ultrasonic transducers 226 outside region 132 can be either disabled, or otherwise operated at a lower power state than ultrasonic transducers 226a-226d. For example, the transmitter of each of the rest of ultrasonic transducers 226 outside region 132 can be disabled so as not to transmit an ultrasonic wave, or can be operated to transmit an ultrasonic wave with reduced signal strength.

With the arrangements of FIG. 2A, only a subset of array of ultrasonic transducers 226 is enabled to perform the focused sensing operation. Such arrangements can eliminate, or at least reduce, the power wasted in generating and transmitting ultrasonic waves that are not reflected by the user's finger and not involved in the imaging of the user's fingerprint (e.g., ultrasonic waves 130a and 130c-h in FIG. 1C). As a result, the power efficiency of the ultrasonic sensing operation can be improved.

Figure 3A:
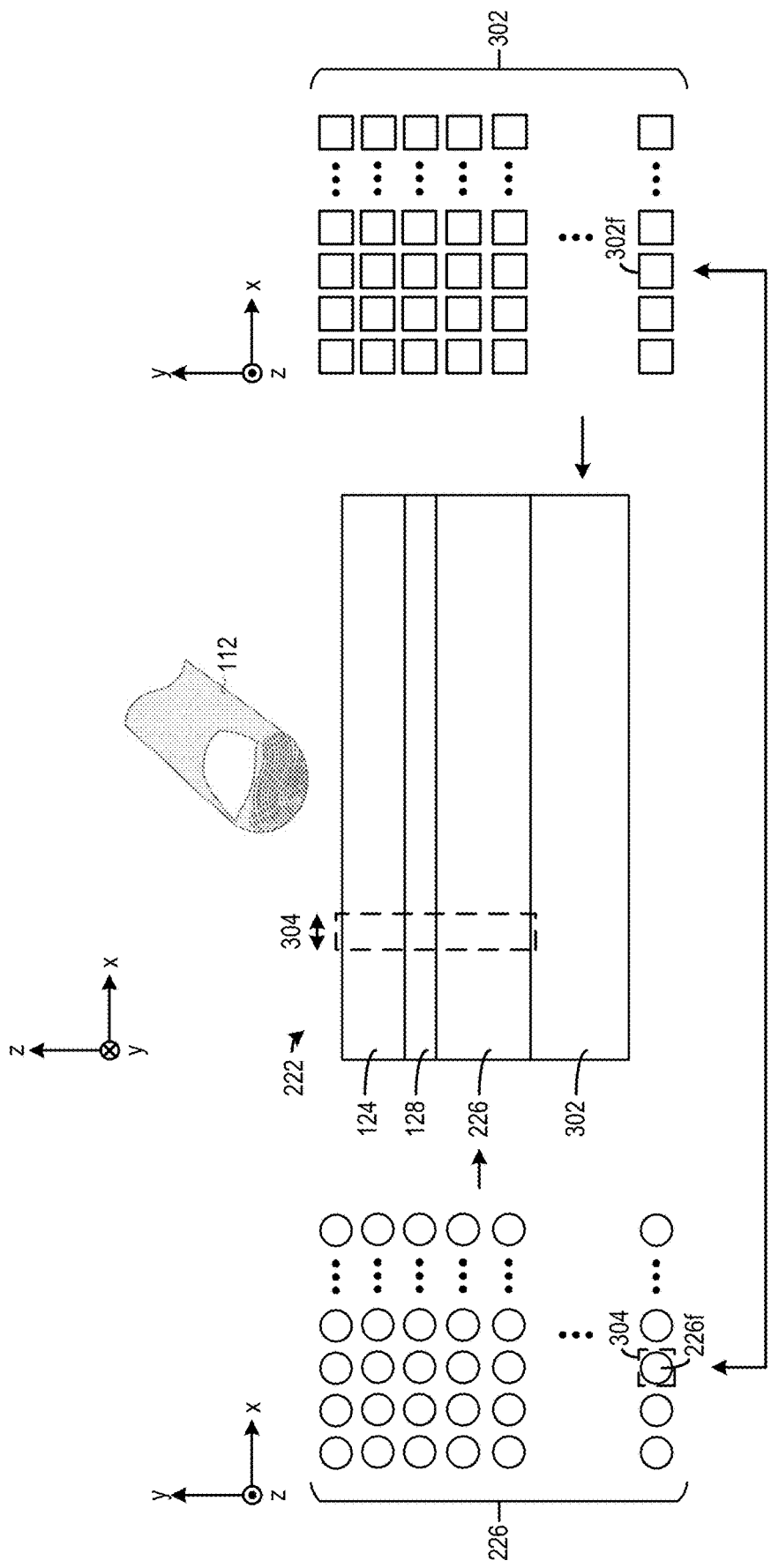
FIG. 3A, FIG. 3B, FIG. 3C, FIG. 3D, and FIG. 3E illustrate example techniques to perform focused ultrasonic sensing operation, according to examples of the present disclosure.

FIG. 3A-FIG. 3E illustrate example techniques to identify the subset of array of ultrasonic transducers 226 to perform the focused sensing operation. As shown in FIG. 3A, touch display interface 222 may include an array of capacitive sensors 302 which can form a stack with display screen 124, layer of display pixels circuit 128, and array of ultrasonic transducers 226. Array of capacitive sensors 302 can be arranged in a two-dimensional grid below the entirety of display screen 124 as well as the entirety of array of ultrasonic transducers 226. Each capacitive sensor 302 can measure the capacitance above a region (e.g., on the x-y plane) of display screen 124 that overlaps with one or more ultrasonic transducers 226. For example, in FIG. 3A, capacitor sensor 302f can measure a capacitance over a region 304 of display screen 124 that overlaps with ultrasonic transducer 226f. In some other examples, each capacitor sensor can a capacitance over a region that covers multiple ultrasonic transducers (e.g., row(s) or column(s) of ultrasonic transducers 226).

As to be described below, depending on a mode of capacitance measurement operation, the measured capacitances of a region can increase or decrease when an object approaches the region. A determination of an object (e.g., finger portion 112) is at proximity of touch display interface 222 (e.g., with a threshold distance), as well as a determination of the region of display screen 124 that overlaps with the object, can then be made based on a degree of change in the measured capacitances from array of capacitive sensors 302.

Figure 3B:
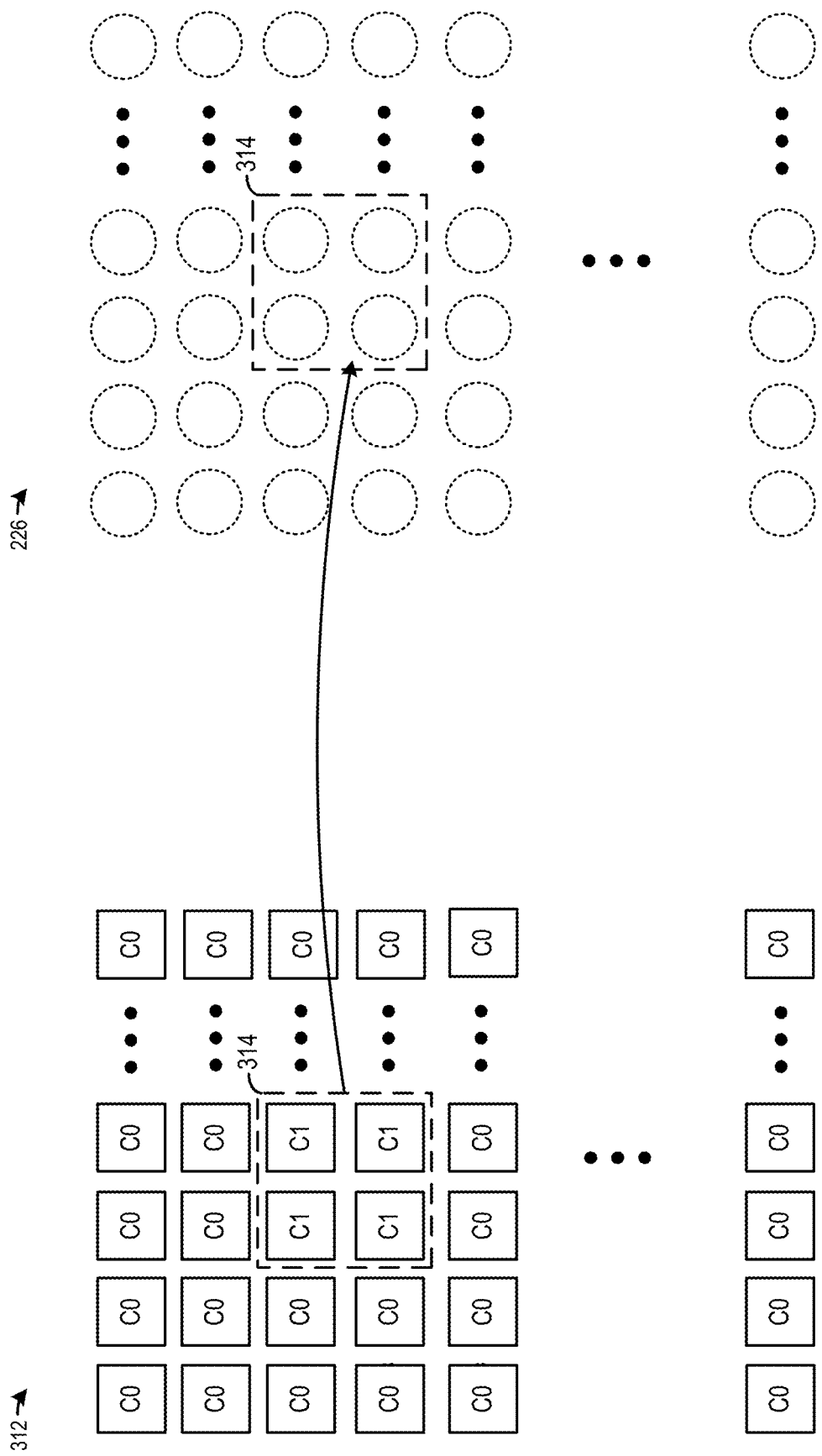

Specifically, referring to FIG. 3B, array of capacitive sensors 302 can output a set of capacitance measurements, such as an array of capacitance measurements 312, with each capacitance measurement output by a capacitive sensor of array of capacitive sensors 302. When an object is within a predetermined distance from a region 314 of display screen 124, a subset of capacitive sensors 302 under region 314 can output a capacitance of C1, whereas each of the rest of array of capacitive sensors 302 outputs a capacitance of C0. Capacitance C0 can be the initial capacitance measured by the subset of capacitive sensors 302 under region 314 when the object is outside the threshold distance from touch display interface 222, whereas capacitance C1 can be bigger than or smaller than capacitance C0. A difference between capacitances C0 and C1 can represent a degree of change of the capacitance measured by the subset of capacitive sensors 302 under region 314. A determination can be made that an object is within a threshold distance from touch display interface 222 can be made based on for example, a difference between capacitances C0 and C1 exceeding a threshold. Moreover, based on the change of capacitances within region 314 (between capacitances C0 an C1) exceeding the threshold, a determination can also be made that the object (e.g., finger portion 112) overlaps with region 314, and a subset of array of ultrasonic transducers 226 under region 314 can be enabled to perform the ultrasonic sensing operation.

Figure 3C:
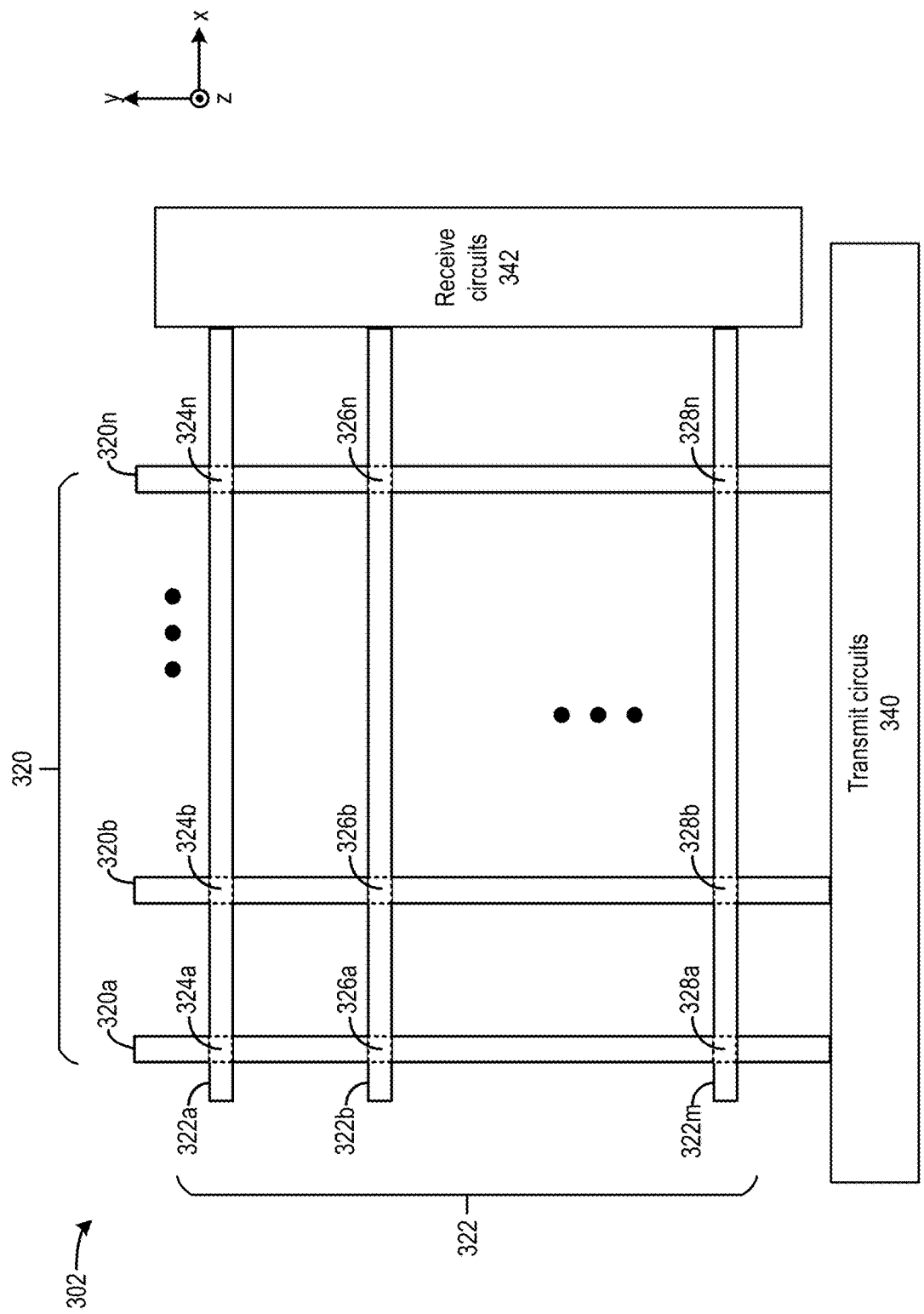
Figure 3D:
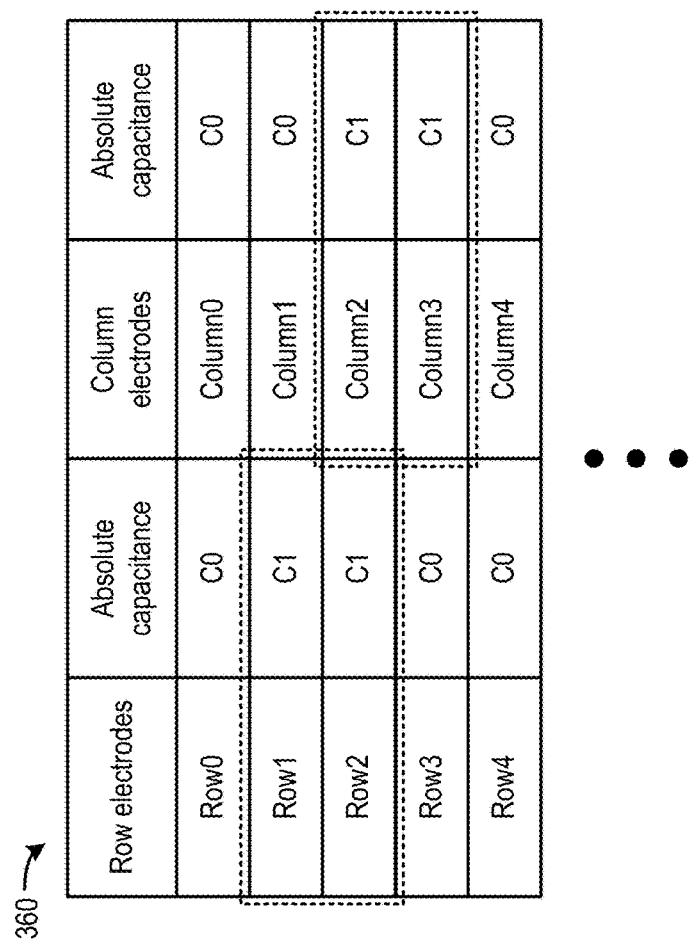
Figure 3D:
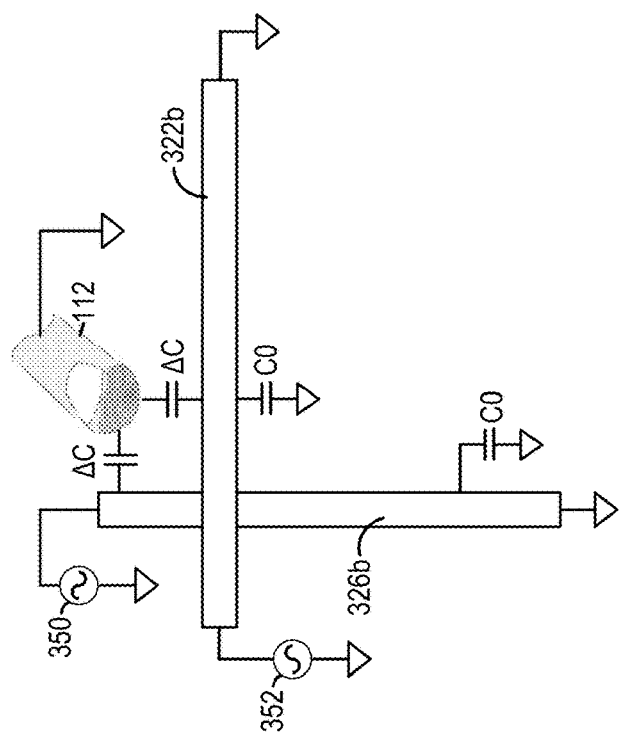
Figure 3E:
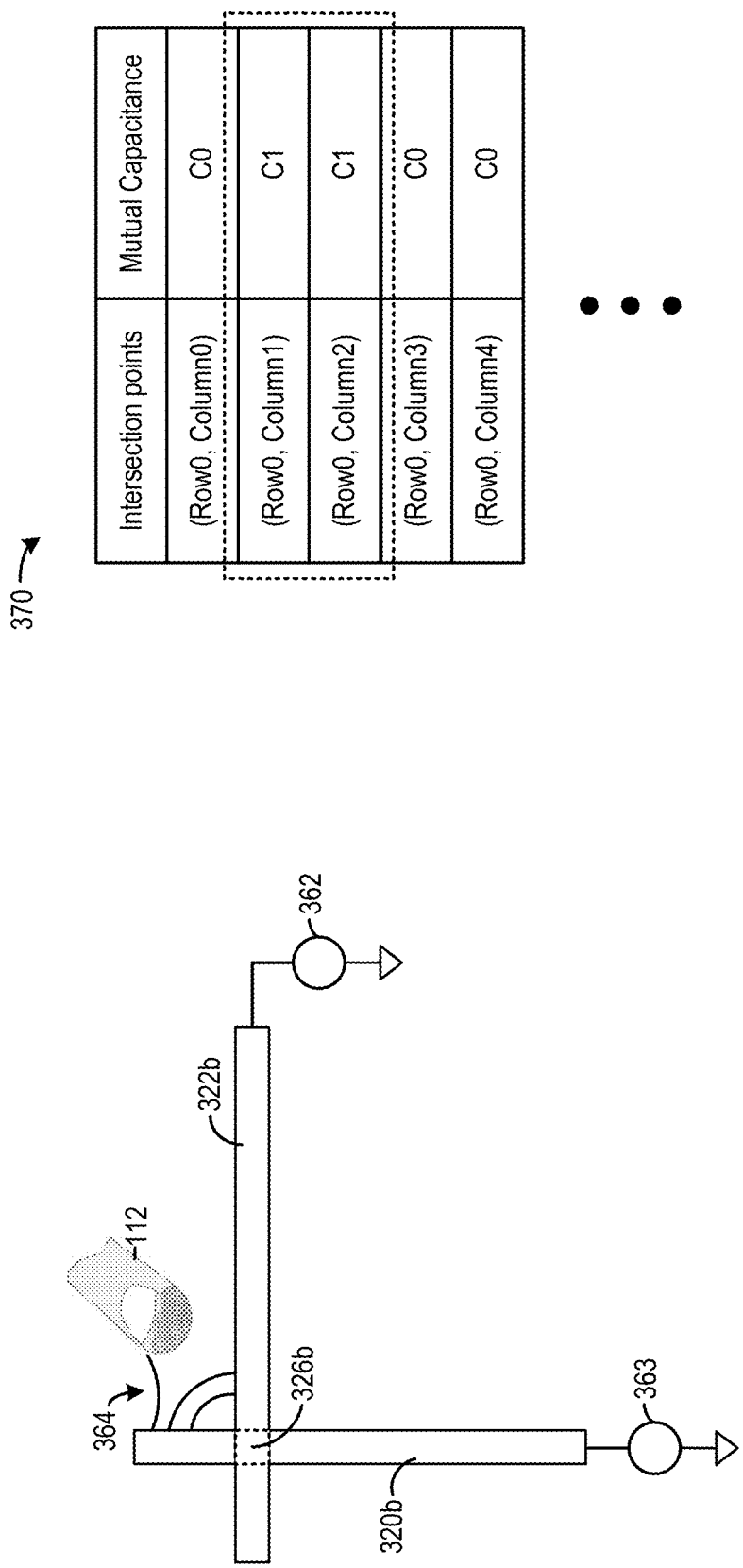

FIG. 3C, FIG. 3D, and FIG. 3E illustrate examples of internal components of array of capacitive sensors 302. As shown in FIG. 3C, array of capacitive sensors 302 comprises a first set of electrodes arranged along a first axis (e.g., x-axis) and configured as column electrodes 320 (e.g., electrodes 320a, 320b, 320n, etc.), and a second set of electrodes arranged a long a second axis (e.g., y-axis) and configured as row electrodes 322 (e.g., electrodes 322a, 322b, 322m, etc.). Row electrodes 322 can overlie on column electrodes 320, and the two sets of electrodes can be separated by an electrical insulator. Each electrode can form a capacitive sensor. The electrodes can form a two-dimensional grid below the entirety of display screen 124. The intersection points between the row electrodes and the column electrodes on the two-dimensional grid, including intersection points 324a, 324b, 324n (between row electrode 322a and each of column electrodes 320a, 320b, and 320n), intersection points 326a, 326b, 326n (between row electrode 322b and each of column electrodes 320a, 320b, and 320n), and intersection points 328a, 328b, and 328n (between row electrodes 322m and each of column electrodes 320a, 320b, and 320n) can define different locations on display screen 124.

In addition, column electrodes 320 are connected to transmit circuits 340, whereas row electrodes 332 are connected to receive circuits 342. As to be described below, depending on a mode of capacitance measurement operation, transmit circuits 340 and receive circuits 342 can drive the row electrodes and the column electrodes with different signals to either measure the absolute capacitances of each electrodes, or to measure the mutual capacitances between each row electrode and each column electrode at the intersection points. In both cases, capacitances at different regions of the two-dimensional grid formed by the row and column electrodes can be measured, and a change in the capacitance of a particular region can be detected when an object is in proximity to that region.

FIG. 3D illustrates an example of a first mode of capacitance measurement operation, in which the absolute capacitances of each electrode is measured. As shown in FIG. 3D, each row electrode and each column electrode can have an initial capacitance C0 with respect to ground. When an object (e.g., finger portion 112) is in proximity to at a particular electrode, an additional capacitance to ground can be formed between the object and the electrode, which adds to the initial capacitance C0 of that electrode. The added capacitance depends on the distance between the object and the electrode, with a shorter distance leading to a larger added capacitance and vice versa. For example, in FIG. 3D, finger portion 112 is in proximity to row electrode 322b and column electrode 320b. As a result, each electrode can have an increased capacitance of $C0+\Delta C$ to ground.

To perform the first mode of capacitance measurement operation, transmit circuits 340 can connect the transmit column electrodes to ground, whereas receive circuits 342 can connect the row electrodes to ground. A scanning circuit can scan through each row electrode and column electrode sequentially, such as by connecting the electrode to an AC source such as AC sources 350 and 352, and measure the amount of current on each electrode, which indicates the capacitance (with respect to ground) of each electrode. In some examples, the scanning circuit may operate in a low power mode and only scans through each row electrode. When finger portion 112 approaches one or more electrodes, the capacitances of those electrodes increase, which can be reflected in the increased currents that flow through those electrodes.

Table 360 illustrates an example of the scanning result. As shown in table 360, row electrodes Row1 and Row2, as well as column electrodes Column2 and Column3, have measured absolute capacitances C1, while the rest of the electrodes have initial absolute capacitance C0. If the difference between capacitances C0 and C1 exceeds a threshold, which indicate that an object is with a threshold distance from row electrodes Row1 and Row2 and column electrodes Column2 and Column3, a determination can be made that the object is in proximity to a region defined by the intersection points between electrode Row1 and each of column electrodes Column2 and Column3, and between electrode Row2 and each of column electrodes Column2 and Column3. A subset of ultrasonic transducers 226 that overlap with that region can then be enabled to perform a ultrasonic sensing operation for the object.

FIG. 3E illustrates an example of a second mode of capacitance measurement operation, in which the mutual capacitances between each row electrode and each column electrode at the intersection points are measured. In the second mode of capacitance measurement operation, each row electrode and each column electrode can be connected to a voltage source to create an electric field at an intersection point between a row electrode and a column electrode. For example, as shown in FIG. 3E, row electrode 322b can be connected to a voltage source 362 to conduct a first voltage, whereas column electrode 320b can be connected to a voltage source 363 to conduct a second voltage, and an electric field 364 can be created at intersection point 326b between the first and second voltages. The electric field can also set an initial mutual capacitance C0 between row electrode 322b and column electrode 320b at intersection point 326b. When an object (e.g., finger portion 112) is in proximity to at a particular intersection point, the object can interrupt/disturb the electric field between the electrodes at that intersection point, and the mutual capacitance at that intersection point can become reduced. The reduction in the capacitance also depends on the distance between the object and the electrode, with a shorter distance leading to a larger blockage of electric field and a larger reduction in the capacitance, and vice versa. For example, in FIG. 3D, finger portion 112 is in proximity to intersection point 326b, and the mutual capacitance can become C0-AC.

To perform the second mode of capacitance measurement operation, transmit circuits 340 can connect the transmit column electrodes to a first set of voltage sources (e.g., voltage source 362), whereas receive circuits 342 can connect the row electrodes to a second set of voltage sources (e.g., voltage source 363, which can include ground). A scanning circuit can scan through each pair of intersecting row electrode and column electrode, such as by connecting the electrode to an AC source such as AC sources 350 and 352 of FIG. 3D, and measure the amount of current on each electrode. The current can measure the capacitance (with respect to ground) of each electrode, which is half of the mutual capacitance between the electrodes at the intersecting point. When finger portion 112 approaches an intersection point, the mutual capacitance of that intersection point decreases, which can be reflected in the increased currents that flow through those electrodes.

Table 370 illustrates an example of the scanning result. As shown in table 370, a first intersection point between row( ) and column1, and a second intersection point between row( ) and column2, can have reduced mutual capacitance C1, whereas the rest of the intersection points have the initial mutual capacitance C0. Based on table 370, a determination can be made that the object is in proximity to the first and second intersection points. A subset of ultrasonic transducers 226 that overlap with those intersection points can then be enabled to perform a ultrasonic sensing operation for the object.

The mutual capacitance measurement operation in FIG. 3E allows measurements of capacitance changes at individual intersection points, which allow detection of multiple objects (e.g., multiple fingers) at multiple discrete regions of the display screen 124. Such arrangements, in turn, allow multiple subsets of ultrasonic transducers 226 under multiple discrete regions to be enabled to perform the ultrasonic sensing operation for the multiple objects. But the mutual capacitance measurement operation in FIG. 3E typically uses more power (e.g., compared with the absolute capacitance measurement operation in FIG. 3D), as the electrodes are connected to voltage sources to generate the electric fields. Therefore, in a case where only a single object needs to be detected (e.g., a single finger portion to provide a single fingerprint), the absolute capacitance measurement operation in FIG. 3D can be used to detect the object, and to identify a single subset of ultrasonic transducers 226 under a single region of display screen 124 to perform the ultrasonic sensing operation.

In some examples, in addition to or in lieu of outputs from array of capacitive sensors 302, a prediction can be made about which region on display screen 124 is touched or operated by a user, based on a state of operation of electronic device 120. A subset of array of ultrasonic transducers 226 under the predicted region can then be enabled.

Figure 4:
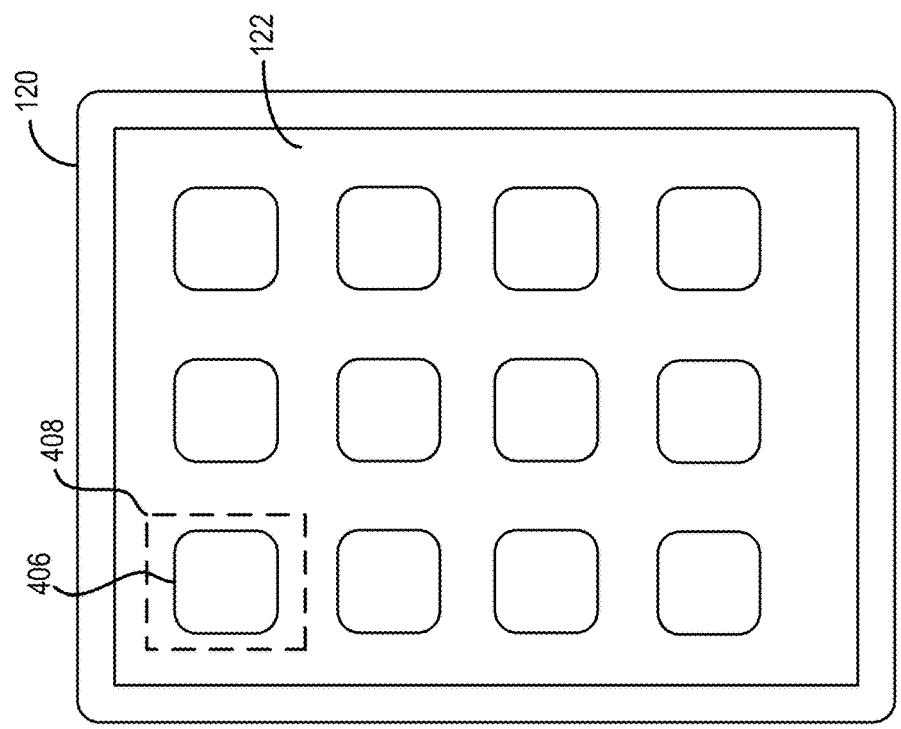
FIG. 4 illustrate additional example techniques to perform focused ultrasonic sensing operation, according to examples of the present disclosure.
Figure 4:
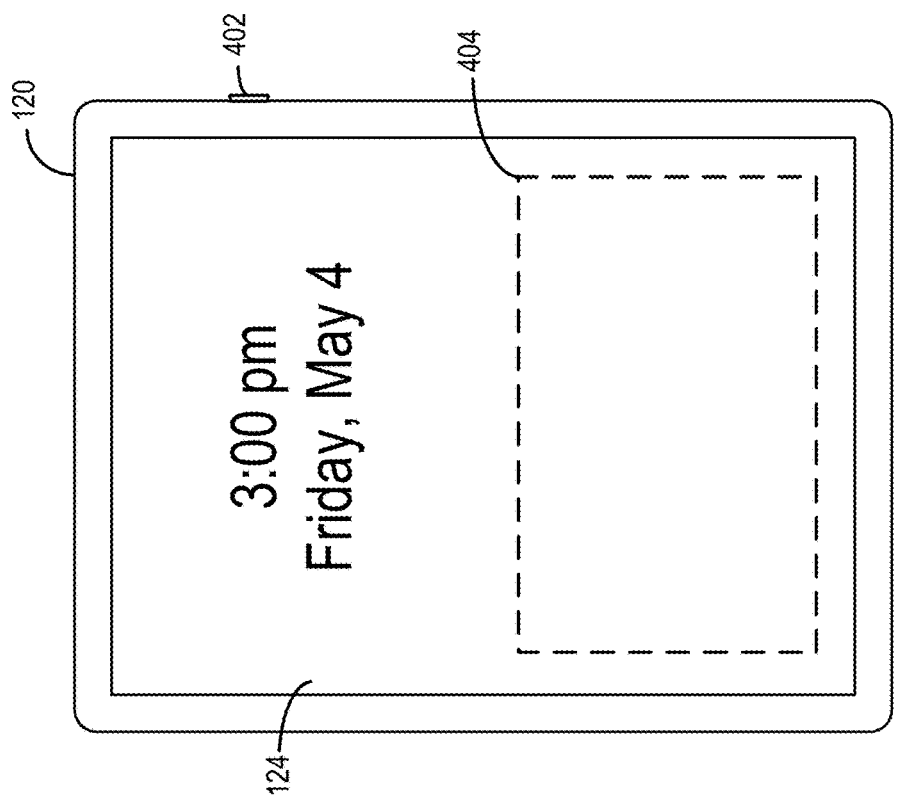

FIG. 4 illustrates example techniques to predict a region on display screen 124 is touched or operated by a user. As shown on the left of FIG. 4, electronic device 120 may include a button 402 which, when pressed by a user, can wake up electronic device 120 and cause display screen 124 to display the lock screen. Upon receiving an indication that button 402 is pressed, a prediction can be made that a user touches or operates in a region 404 of display screen 124. The prediction can be made based on, for example, a history of the user's operation of electronic device 120, which can indicate that the user frequently touches or gestures at touching region 404 when the lock screen is displayed. Based on the prediction, a subset of array of ultrasonic transducers 226 under region 404 can then be enabled to detect the user's finger portion, while the rest of ultrasonic transducers 226 outside region 404 can be disabled or operated at a low power state.

In some examples, the prediction can also be made solely based on the content being displayed. For example, as shown on the right of FIG. 4, electronic device 120 may display a plurality of icons each associated with an application or a specific function of electronic device 120, including icon 406. Each icon is to be activated by the user through touching a region of display screen 124 enclosing the icon, such as region 408 enclosing icon 406. Based on electronic device 120 displaying the plurality of icons, a subset of array of ultrasonic transducers 226 under region 408 can then be enabled to detect the user's finger portion. In some examples, subsets of array of ultrasonic transducers 226 under each region enclosing an icon can be enabled but operated at different power states. The subset of ultrasonic transducers 226 under the region surrounding the icon most likely to be touched by the user (e.g., based on the user's usage history, the current time/date, etc.) can be operated at the highest power state.

Figure 5:
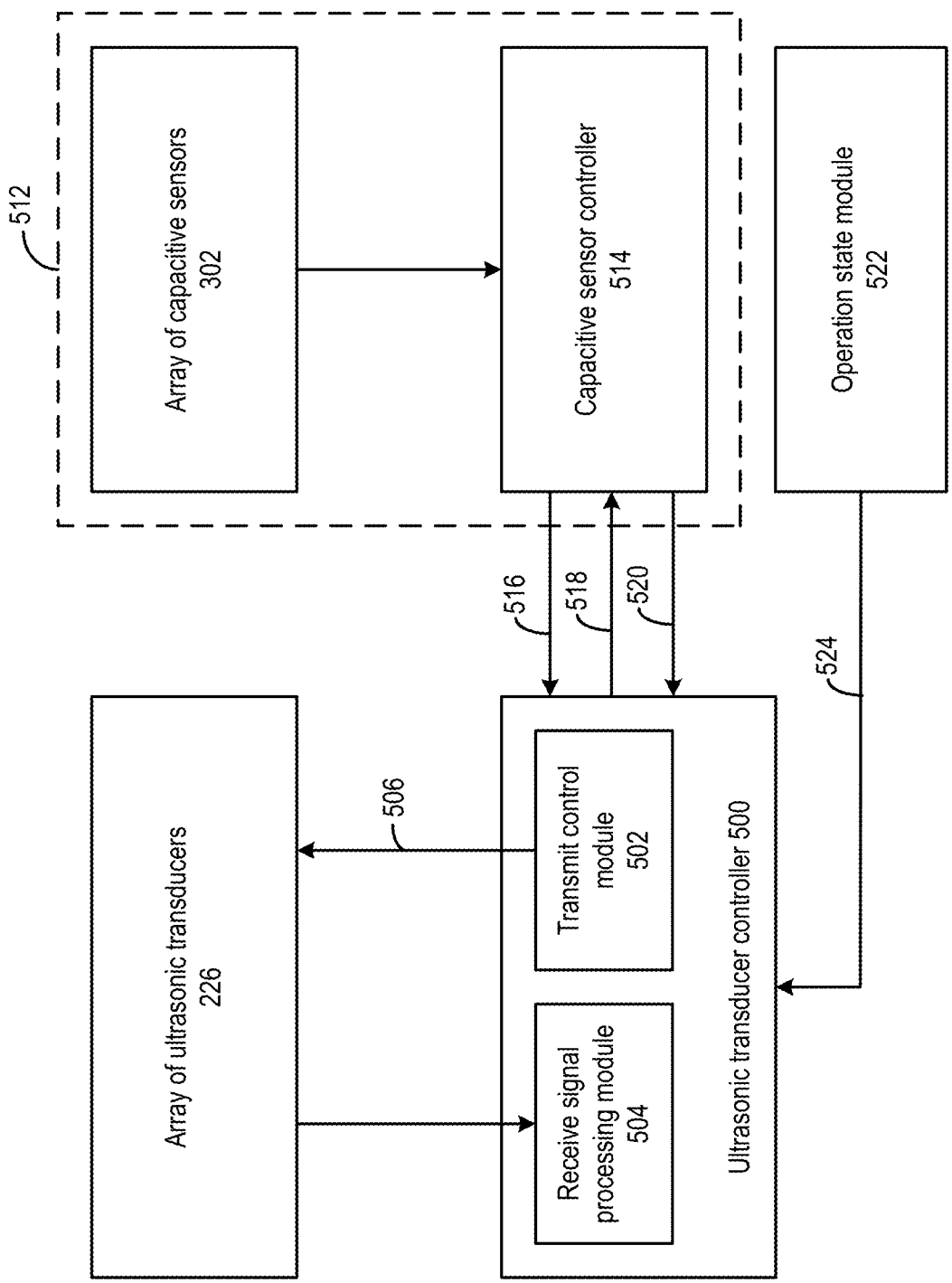
FIG. 5 illustrates an example of an ultrasonic controller that can implement at least some of the disclosed techniques, according to examples of the present disclosure.

FIG. 5 illustrates an example ultrasonic transducer controller 500 that can implement the techniques described above. In some examples, ultrasonic transducer controller 500 can be part of an application processor and is coupled with array of ultrasonic transducer 226. Ultrasonic transducer controller 500 includes a transmit control module 502 and a receive signal processing module 504. Transmit control module 502 can determine a subset of array of ultrasonic transducers 226 to be enabled to perform a focused ultrasonic sensing operation of an object. Based on the selection, transmit control module 502 can transmit signals 506, which can include row select and column select signals targeted at row selector 232 and column selector 242, to enable the selected subset of ultrasonic transducers 226 to transmit ultrasonic waves. Receive signal processing module 504 can receive signal 508 indicative of a distribution of the reflected ultrasonic waves detected by the selected subset of ultrasonic transducers 226. Based on the distribution, an image of the object (e.g., a fingerprint image) can be created.

In some examples, ultrasonic transducer controller 500 can be coupled with a capacitive sensor module 512 including array of capacitive sensors 302 and a capacitive sensor controller 514, where array of capacitive sensor 302 and array of ultrasonic transducers 226 are stacked as part of touch display interface 222 as shown in FIG. 3A. Capacitive sensor controller 514 can track the capacitances measured by array of capacitive sensors 302 and detect that an object is in proximity to array of capacitive sensors 302 based on, for example, a change in the capacitance measured by at least one capacitive sensor (e.g., an absolute capacitance of a particular row electrode, an absolute capacitance of a particular column electrode, a mutual capacitance at a particular intersection point between a row electrode and a column electrode, etc.) exceeding a threshold. Based on the detection, capacitive sensor controller 514 can transmit an indication 516 to ultrasonic transducer controller 500. In some examples, indication 516 can be an interrupt.

Upon receiving indication 516, ultrasonic transducer controller 500 can transmit a query 518 to capacitive sensor controller 514 to obtain raw capacitance measurements. The raw capacitance measurements can include, for example, measurements of capacitances of each row and column electrodes, measurements of capacitances of each row electrode if capacitive sensor controller 514 operates in a low power mode, a mutual capacitance at each particular intersection points, etc., obtained by array of capacitive sensors, such as the measurement results shown in table 360 of FIG. 3D and in table 370 of FIG. 3E. Based on the raw capacitance measurements, transmit control module 502 can determine the subset of ultrasonic transducers 226 to be enabled. For example, referring to FIG. 3D, transmit control module 502 can identify the row and column electrodes for which a reduction of the absolute capacitance exceeds a threshold, and determine a region of display screen 124 defined by the row and column electrodes. As another example, referring to FIG. 3E, transmit control module 502 can identify the intersection points for which a reduction of the mutual capacitance exceeds a threshold, and determine a region of display screen 124 comprising the identified intersection points. In both examples, transmit control module 502 can then enable the subset of ultrasonic transducers 226 that overlap with that region to perform an ultrasonic sensing operation for the object.

In some examples, ultrasonic transducer controller 500 can be coupled with an operation state module 522 which tracks a state of operation of electronic device 120. The state of operation can include, for example, a wake-up state of electronic device 120, the content being displayed by electronic device 120. Operation state module 522 can transmit an indication 524 indicating that a user is about to operate (or operates) display screen 124 based on, for example, receiving an indication that a button (e.g., button 402 of FIG. 4) of the electronic device is pressed and a lock screen is displayed on display screen 124, a plurality of icons is being displayed on display screen 124, etc.

Upon receiving indication 524, transmit control module 502 can predict a region of display screen 124 the user touches or operates. The prediction can be made based on, for example, a history of the user's operation of electronic device 120 (e.g., based on prior raw capacitance measurement results from capacitive sensor module 512), which can indicate that the user frequently touches or gestures at a particular region 404 when the lock screen is displayed. The prediction can also be made based on the locations of the icons, each of which is to be activated by the user through touching a region of display screen 124 enclosing the icon. Transmit control module 502 can then enable the subset of ultrasonic transducers 226 under the predicted region to perform the focused ultrasonic sensing operation.

Figure 6:
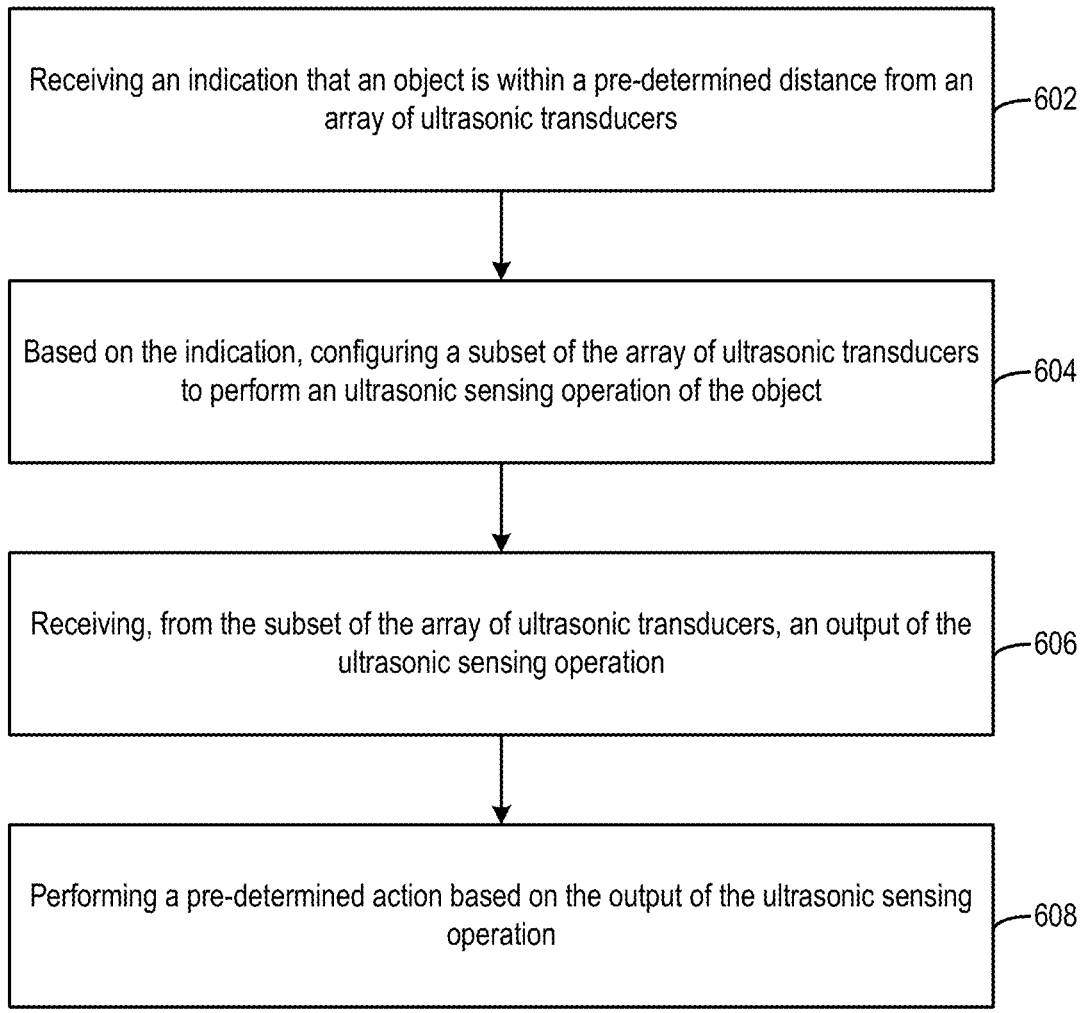
FIG. 6 illustrates an example method of operating an ultrasonic sensing system, according to examples of the present disclosure.

FIG. 6 illustrates an example method 600 of performing an ultrasonic sensing operation. Method 600 can be performed by, for example, ultrasonic transducer controller 500 of FIG. 5 in conjunction with other components of electronic device 120, such as display screen 124.

In operation 602, ultrasonic transducer controller 500 receives an indication that an object is within a distance from an array of ultrasonic transducers (e.g., array of ultrasonic transducers 226).

Specifically, in some examples, the indication can come from a capacitive sensor module, such as capacitive sensor module 512 including array of capacitive sensors 302 and a capacitive sensor controller 514, where array of capacitive sensor 302 and array of ultrasonic transducers 226 are stacked as part of touch display interface 222 as shown in FIG. 3A. Capacitive sensor controller 514 can track the capacitances measured by array of capacitive sensors 302 and detect that an object is in proximity to array of capacitive sensors 302 based on, for example, a change in the capacitance measured by at least one capacitive sensor exceeding the threshold. The capacitance measured can include, for example, an absolute capacitance of a particular row electrode, an absolute capacitance of a particular column electrode, a mutual capacitance at a particular intersection point between a row electrode and a column electrode, etc., as described in FIG. 3C and FIG. 3D. Based on the detection, capacitive sensor controller 514 can transmit the indication to ultrasonic transducer controller 500. In some examples, the indication can be an interrupt.

In some examples, the indication can also reflect a state of operation of electronic device 120, such as a wake-up state of electronic device 120, the content being displayed by electronic device 120, etc. The indication can be received from operation state module 522 indicating that a user is about to operate (or operates) display screen 124 based on, for example, receiving an indication that a button (e.g., button 402 of FIG. 4) of the electronic device is pressed and a lock screen is displayed on display screen 124, a plurality of icons is being displayed on display screen 124, etc.

In operation 604, ultrasonic transducer controller 500, based on the indication, configures a subset of the array of ultrasonic transducers to perform an ultrasonic sensing operation on the object.

Specifically, in a case where ultrasonic transducer controller 500 receives the indication from capacitive sensor module 512, ultrasonic transducer controller 500 can transmit a query 518 to capacitive sensor controller 514 of the capacitive sensor module to obtain raw capacitance measurements 520, which may be sent from capacitive sensor controller 514 back to ultrasonic transducer controller 500. The raw capacitance measurements can include, for example, measurements of capacitances of each row and column electrodes, measurements of capacitances of each row electrode if capacitive sensor controller 514 operates in a low power mode, a mutual capacitance at each particular intersection points, etc., obtained by array of capacitive sensors, such as the measurement results shown in table 360 of FIG. 3D and in table 370 of FIG. 3E. Based on the raw capacitance measurements, transmit control module 502 can determine the subset of ultrasonic transducers 226 to be enabled. For example, referring to FIG. 3D, transmit control module 502 can identify the row and column electrodes for which a reduction of the absolute capacitance exceeds a threshold, and determine a region of display screen 124 defined by the row and column electrodes. As another example, referring to FIG. 3E, transmit control module 502 can identify the intersection points for which a reduction of the mutual capacitance exceeds a threshold, and determine a region of display screen 124 comprising the identified intersection points. In both examples, transmit control module 502 can then enable the subset of ultrasonic transducers 226 that overlap with that region to perform the ultrasonic sensing operation for the object.

According to certain aspects of the disclosure, a scanning pattern is used to make detection of the object (e.g., the user's touch) a more efficient process. For instance, to the extent that capacitive sensor controller 514 scans individual sensors in the array of capacitive sensors 302 in sequential fashion, capacitive sensor controller 514 may do so according to a scan pattern. The scan pattern may follow a traditional path, such as starting with the first sensor in a row, then the second sensor in the same row, and so on, until the row is complete, and repeating the same procedure for each row in an ordered fashion. In some examples, however, the the scan pattern may follow a different path that takes into account locations that are more likely to be touched by the sensor at any given time. Instead of starting at a location corresponding to, for example, the first row and first column of the array of capacitive sensors 302, the scanning pattern may start at a location that is most likely to be touched by the user.

The scanning pattern may vary depending on specifics of the user interface, icons associated with applications being presented and/or used, etc. In one example, when an electronic device 120 is locked, and the likely user touch is a "left swipe" or "right swipe" toward the bottom of the screen (to perform an unlock operation), the scanning pattern may begin in the lower half of the screen. For instance, the scanning pattern may start at the top of the bottom half of the screen. The scannin pattern can then continue row by row toward the bottom of the screen, then continue to the top half of the screen. Such a non-traditional scanning path may be more efficient and faster in detecting a user touch when the electronic device 120 is in the locked mode. In another example, the scanning pattern prioritizes locations such as known icon locations where the user is more likely to touch.

In yet another example, the scanning pattern prioritizes locations where user control are positioned, such as the location of a "back" button. Such a scanning pattern may be used, for example, by capacitive sensor module 514 in generating the indication 516 and/or generating the raw capacitance measurements 520 which are provided to ultrasonic transducer controller 500. By utilizing a scanning pattern that prioritizes locations more likely to be touched by the user, actual detection of the user's touch may occur sooner in the scanning sequence, which can lead to earlier detection and improvement in the overall efficiency of the ultrasonic sensing operation.

Moreover, in a case where ultrasonic transducer controller 500 receives the indication from operation state module 522, upon receiving indication 524, transmit control module 502 can predict a region of display screen 124 the user touches or operates. The prediction can be made based on, for example, a history of the user's operation of electronic device 120 (e.g., based on prior raw capacitance measurement results from capacitive sensor module 512), which can indicate that the user frequently touches or gestures at a particular region 404 when the lock screen is displayed. The prediction can also be made based on the locations of the icons, each of which is to be activated by the user through touching a region of display screen 124 enclosing the icon. Transmit control module 502 can then enable the subset of ultrasonic transducers 226 under the predicted region to perform the focused ultrasonic sensing operation.

In operation 606, ultrasonic transducer controller 500 receives, from the subset of the array of ultrasonic transducers, an output of the ultrasonic sensing operation. Specifically, referring to FIG. 1A and FIG. 1B, ultrasonic sensors of array of ultrasonic transducers 226 can receive ultrasonic wave with different intensities reflected by the object (e.g., finger). Receive signal processing module 504 can create a distribution of signal strengths of ultrasonic reflections 114.

In operation 608, ultrasonic transducer controller 500, or other components of electronic device 120, performs an action based on the output of the ultrasonic sensing operation. The action may include, for example, generating an image of the finger based on a distribution of signal strengths of the reflected ultrasonic signals, comparing the image with a reference image of a fingerprint to generate a comparison result, and based on the comparison result, allowing access to a function of a device. For example, based on the comparison result, a user who seeks to access certain icons/apps of an electronic device can be authenticated and granted access to the icons/apps.

Figure 7:
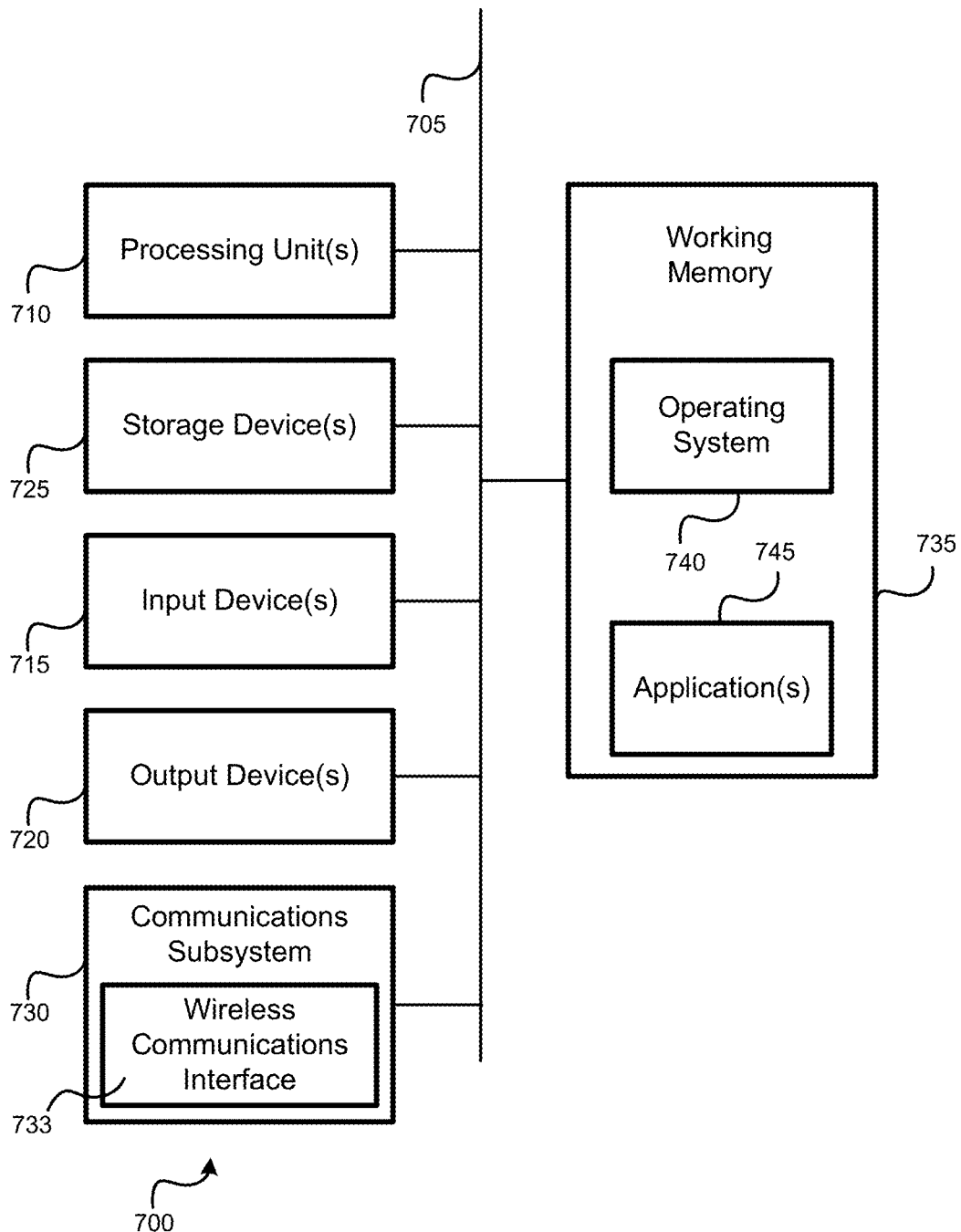
FIG. 7 illustrates an example of a computing system in which examples of the present disclosure may be implemented.

FIG. 7 provides a schematic illustration of one embodiment of a computer system 700 that can perform various blocks of the methods provided by various embodiments. A computer system as illustrated in FIG. 7 may be incorporated as part of the previously described computerized devices, such as electronic device 120, etc. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general purpose processors and/or one or more special purpose processors (such as digital signal processing chips, graphics acceleration processors, video decoders, and/or the like); one or more input devices 715, which can include, without limitation, a mouse, a keyboard, remote control, and/or the like; and one or more output devices 720, which can include, without limitation, a display device, a printer, and/or the like. As used herein, a controller can include functionality of a processor (such as processors 710).

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 770, which can include without limitation a modem, a network card (wireless or wired), an infrared communication device, a wireless communication device, and/or a chipset (such as a Bluetooth™ device, an 802.11 device, a Wi-Fi device, a WiMax device, cellular communication device, GSM, CDMA, WCDMA, LTE, LTE-A, LTE-U, etc.), and/or the like. The communications subsystem 770 may permit data to be exchanged with a network (such as the network described below, to name one example), other computer systems, and/or any other devices described herein. In many embodiments, the computer system 700 will further comprise a working memory 775, which can include a RAM or ROM device, as described above.

The computer system 700 also can comprise software elements, shown as being currently located within the working memory 775, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 775. Such instructions may be read into the working memory 775 from another computer-readable medium, such as one or more of the non-transitory storage device(s) 725. Merely by way of example, execution of the sequences of instructions contained in the working memory 775 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 775.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 770 (and/or components thereof) generally will receive signals, and the bus 705 then might carry the signals (and/or the data, instructions, etc. carried by the signals) to the working memory 775, from which the processor(s) 710 retrieves and executes the instructions. The instructions received by the working memory 775 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be re-arranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

In view of this description embodiments may include different combinations of features. Implementation examples are described in the following numbered clauses:

Clause 1. A method, comprising: receiving an indication that an object is within a distance from an array of ultrasonic transducers; based on the indication, configuring a subset of the array of ultrasonic transducers to perform an ultrasonic sensing operation on the object; obtaining, from the subset of the array of ultrasonic transducers, an output of the ultrasonic sensing operation; and performing an action based on the output of the ultrasonic sensing operation.

Clause 2. The method of clause 1, wherein the indication is received from a capacitive sensor module comprising an array of capacitive sensors that form a stack with the array of ultrasonic transducers; and wherein the indication is generated based on the capacitive sensor module detecting that the object is within the distance from the array of capacitive sensors.

Clause 3. The method of any of clauses 1-2 wherein the indication is generated based on a degree of change in a capacitance measured by a capacitive sensor of the array of capacitive sensors exceeding a first threshold.

Clause 4. The method of clause 3 wherein the array of capacitive sensors comprise an array of electrodes; and wherein the capacitance measured by the capacitive sensor is between an electrode of the array of electrodes and ground.

Clause 5. The method of any of clauses 1-4 wherein the array of capacitive sensors comprise a first array of electrodes and a second array of electrodes; and wherein the capacitance measured by the capacitive sensor is a mutual capacitance at an intersection point between a first electrode of the first array of electrodes and a second electrode of the second array of electrodes.

Clause 6. The method of any of clauses 3-5 further comprising receiving, from the capacitive sensor module, capacitances measured by the array of capacitive sensors; determining a subset of the array of capacitive sensors for which degrees of change in the measured capacitances exceed a second threshold; and identifying the subset of the array of ultrasonic transducers based on the subset of the array of capacitive sensors.

Clause 7. The method of any of clauses 2-6 wherein the indication is generated by the capacitive sensor module by sequentially scanning sensors in the array of capacitive sensors, according to a scanning pattern prioritizing locations likely to be touched by a user.

Clause 8. The method of any of clauses 1-7 wherein each of the array of ultrasonic transducers comprises an ultrasonic signal transmitter and an ultrasonic signal receiver; and wherein configuring a subset of the array of ultrasonic transducers to perform a sensing operation of the object comprises: configuring the ultrasonic signal transmitters of the subset of the array of ultrasonic transducers to transmit ultrasonic signals; configuring the subset of the array of ultrasonic transducers to detect the ultrasonic signals reflected by the object; and receiving, from the subset of the array of ultrasonic transducers, detection outputs of the reflected ultrasonic signals.

Clause 9. The method of clause 8 wherein the subset of the array of ultrasonic transducers is a first subset of the array of ultrasonic transducers; wherein the method further comprises: disabling a second subset of the array of ultrasonic transducers, or reducing a power level of the second subset of the array of ultrasonic transducers, when the first subset of the array of ultrasonic transducers perform the ultrasonic sensing operation.

Clause 10. The method of any of clauses 1-9 wherein the object comprises a finger; and wherein the action comprises: generating an image of the finger based on a distribution of signal strengths of reflected ultrasonic signals; and transmitting the image to another component to enable the another component to compare the image with a reference image of a fingerprint to generate a comparison result, and to control access to a function of a device based on the comparison result.

Clause 11. An apparatus, comprising: a memory that stores a set of instructions; and a hardware processor configured to execute the set of instructions to: receive an indication that an object is within a distance from an array of ultrasonic transducers; based on the indication, configure a subset of the array of ultrasonic transducers to perform an ultrasonic sensing operation on the object; obtain, from the subset of the array of ultrasonic transducers, an output of the ultrasonic sensing operation; and perform an action based on the output of the ultrasonic sensing operation.

Clause 12. The apparatus of clause 11, wherein the indication is received from a capacitive sensor module comprising an array of capacitive sensors that form a stack with the array of ultrasonic transducers; and wherein the indication is generated based on the capacitive sensor module detecting that the object is within the distance from the array of capacitive sensors.

Clause 13. The apparatus of any of clauses 11-12 wherein the indication is generated based on a degree of change in a capacitance measured by a capacitive sensor of the array of capacitive sensors exceeding a first threshold.

Clause 14. The apparatus of clause 13 wherein the array of capacitive sensors comprise an array of electrodes; and wherein the capacitance measured by the capacitive sensor is between an electrode of the array of electrodes and ground.

Clause 15. The apparatus of any of clauses 11-14 wherein the array of capacitive sensors comprise a first array of electrodes and a second array of electrodes; and wherein the capacitance measured by the capacitive sensor is a mutual capacitance at an intersection point between a first electrode of the first array of electrodes and a second electrode of the second array of electrodes.

Clause 16. The apparatus of any of clauses 13-15 wherein the hardware processor is further configured to execute the set of instructions to: receive, from the capacitive sensor module, capacitances measured by the array of capacitive sensors; determine a subset of the array of capacitive sensors for which degrees of change in the measured capacitances exceed a second threshold; and identify the subset of the array of ultrasonic transducers based on the subset of the array of capacitive sensors.

Clause 17. The apparatus of any of clauses 12-16 wherein the capacitive sensor module is configured to generate the indication by sequentially scanning sensors in the array of capacitive sensors, according to a scanning pattern prioritizing locations likely to be touched by a user.

Clause 18. The apparatus of any of clauses 11-17 wherein each of the array of ultrasonic transducers comprises an ultrasonic signal transmitter and an ultrasonic signal receiver; and wherein configuring a subset of the array of ultrasonic transducers to perform a sensing operation of the object comprises the hardware processor being configured to: configure the ultrasonic signal transmitters of the subset of the array of ultrasonic transducers to transmit ultrasonic signals; configure the subset of the array of ultrasonic transducers to detect the ultrasonic signals reflected by the object; and receive, from the subset of the array of ultrasonic transducers, detection outputs of the reflected ultrasonic signals.

Clause 19. The apparatus of clause 18 wherein the subset of the array of ultrasonic transducers is a first subset of the array of ultrasonic transducers; wherein the hardware processor is further configured to execute the set of instructions to: disable a second subset of the array of ultrasonic transducers, or reduce a power level of the second subset of the array of ultrasonic transducers, when the first subset of the array of ultrasonic transducers perform the ultrasonic sensing operation.

Clause 20. The apparatus of any of clauses 11-19 wherein the object comprises a finger; and wherein the action comprises: generating an image of the finger based on a distribution of signal strengths of reflected ultrasonic signals; and transmitting the image to another component to enable the another component to compare the image with a reference image of a fingerprint to generate a comparison result, and to control access to a function of a device based on the comparison result.

Clause 21. A non-transitory computer readable medium storing a set of instructions that, when executed by a hardware processor, causes the hardware processor to: receive an indication that an object is within a distance from an array of ultrasonic transducers; based on the indication, configure a subset of the array of ultrasonic transducers to perform an ultrasonic sensing operation on the object; obtain, from the subset of the array of ultrasonic transducers, an output of the ultrasonic sensing operation; and perform an action based on the output of the ultrasonic sensing operation.

Clause 22. The non-transitory computer readable medium of clause 21, wherein the indication is received from a capacitive sensor module comprising an array of capacitive sensors that form a stack with the array of ultrasonic transducers; and wherein the indication is generated based on the capacitive sensor module detecting that the object is within the distance from the array of capacitive sensors.

Clause 23. The non-transitory computer readable medium of any of clauses 21-22 wherein the indication is generated based on a degree of change in a capacitance measured by a capacitive sensor of the array of capacitive sensors exceeding a first threshold.

Clause 24. The non-transitory computer readable medium of clause 23 wherein the array of capacitive sensors comprise an array of electrodes; and wherein the capacitance measured by the capacitive sensor is between an electrode of the array of electrodes and ground.

Clause 25. The non-transitory computer readable medium of any of clauses 21-24 wherein the array of capacitive sensors comprise a first array of electrodes and a second array of electrodes; and wherein the capacitance measured by the capacitive sensor is a mutual capacitance at an intersection point between a first electrode of the first array of electrodes and a second electrode of the second array of electrodes.

Clause 26. The non-transitory computer readable medium of any of clauses 23-25 further comprising instructions that, when executed by the hardware processor, causes the hardware processor to: receive, from the capacitive sensor module, capacitances measured by the array of capacitive sensors; determine a subset of the array of capacitive sensors for which degrees of change in the measured capacitances exceed a second threshold; and identify the subset of the array of ultrasonic transducers based on the subset of the array of capacitive sensors.

Clause 27. The non-transitory computer readable medium of any of clauses 22-26 wherein the indication is generated by the capacitive sensor module by sequentially scanning sensors in the array of capacitive sensors, according to a scanning pattern prioritizing locations likely to be touched by a user.

Clause 28. The non-transitory computer readable medium of any of clauses 21-27 wherein each of the array of ultrasonic transducers comprises an ultrasonic signal transmitter and an ultrasonic signal receiver; and wherein the non-transitory computer readable medium further comprises instructions that, when executed by the hardware processor, causes the hardware processor to: configure the ultrasonic signal transmitters of the subset of the array of ultrasonic transducers to transmit ultrasonic signals; configure the subset of the array of ultrasonic transducers to detect the ultrasonic signals reflected by the object; and receive, from the subset of the array of ultrasonic transducers, detection outputs of the reflected ultrasonic signals.

Clause 29. The non-transitory computer readable medium of clause 28 wherein the subset of the array of ultrasonic transducers is a first subset of the array of ultrasonic transducers; wherein the non-transitory computer readable medium further comprises instructions that, when executed by the hardware processor, causes the hardware processor to: disable a second subset of the array of ultrasonic transducers, or reduce a power level of the second subset of the array of ultrasonic transducers, when the first subset of the array of ultrasonic transducers perform the ultrasonic sensing operation; wherein the object comprises a finger; and wherein the action comprises: generating an image of the finger based on a distribution of signal strengths of reflected ultrasonic signals; and transmitting the image to another component to enable the another component to compare the image with a reference image of a fingerprint to generate a comparison result, and to control access to a function of a device based on the comparison result.

Clause 30. An apparatus, comprising: means for receiving an indication that an object is within a distance from an array of ultrasonic transducers; means for, based on the indication, configuring a subset of the array of ultrasonic transducers to perform an ultrasonic sensing operation on the object; means for obtaining, from the subset of the array of ultrasonic transducers, an output of the ultrasonic sensing operation; and means for performing an action based on the output of the ultrasonic sensing operation.

What is claimed is:

1. A method, comprising:
    receiving an indication that an object is within a distance from an array of ultrasonic transducers, wherein the indication is generated based on a degree of change in a capacitance measured by a capacitive sensor of an array of capacitive sensors exceeding a first threshold and detecting that the object is within the distance from the array of capacitive sensors, wherein the indication is received from a capacitive sensor module comprising the array of capacitive sensors that form a stack with the array of ultrasonic transducers;
    receiving, from the capacitive sensor module, capacitances measured by the array of capacitive sensors;
    determining a subset of the array of capacitive sensors for which degrees of change in the measured capacitances exceed a second threshold; and
    identifying a subset of the array of ultrasonic transducers based on the subset of the array of capacitive sensors;
    based on the indication, configuring the subset of the array of ultrasonic transducers to perform an ultrasonic sensing operation on the object;
    obtaining, from the subset of the array of ultrasonic transducers, an output of the ultrasonic sensing operation; and
    performing an action based on the output of the ultrasonic sensing operation.

2. The method of claim 1, wherein the array of capacitive sensors comprise an array of electrodes; and
    wherein the capacitance measured by the capacitive sensor is between an electrode of the array of electrodes and ground.

3. The method of claim 1, wherein the array of capacitive sensors comprise a first array of electrodes and a second array of electrodes; and
    wherein the capacitance measured by the capacitive sensor is a mutual capacitance at an intersection point between a first electrode of the first array of electrodes and a second electrode of the second array of electrodes.

4. The method of claim 1, wherein the indication is generated by the capacitive sensor module by sequentially scanning sensors in the array of capacitive sensors, according to a scanning pattern prioritizing locations likely to be touched by a user.

5. The method of claim 1, wherein each of the array of ultrasonic transducers comprises an ultrasonic signal transmitter and an ultrasonic signal receiver; and
    wherein configuring a subset of the array of ultrasonic transducers to perform a sensing operation of the object comprises:
        configuring the ultrasonic signal transmitters of the subset of the array of ultrasonic transducers to transmit ultrasonic signals;
        configuring the subset of the array of ultrasonic transducers to detect the ultrasonic signals reflected by the object; and
        receiving, from the subset of the array of ultrasonic transducers, detection outputs of the reflected ultrasonic signals.

6. The method of claim 5, wherein the subset of the array of ultrasonic transducers is a first subset of the array of ultrasonic transducers;
    wherein the method further comprises: disabling a second subset of the array of ultrasonic transducers, or reducing a power level of the second subset of the array of ultrasonic transducers, when the first subset of the array of ultrasonic transducers perform the ultrasonic sensing operation.

7. The method of claim 6, wherein the object comprises a finger; and
    wherein the action comprises:
        generating an image of the finger based on a distribution of signal strengths of reflected ultrasonic signals; and transmitting the image to another component to enable the another component to compare the image with a reference image of a fingerprint to generate a comparison result, and to control access to a function of a device based on the comparison result.

8. An apparatus, comprising:
a memory that stores a set of instructions; and
a hardware processor configured to execute the set of instructions to:
receive an indication that an object is within a distance from an array of ultrasonic transducers, wherein the indication is generated based on a degree of change in a capacitance measured by a capacitive sensor of an array of capacitive sensors exceeding a first threshold and detecting that the object is within the distance from the array of capacitive sensors, wherein the indication is received from a capacitive sensor module comprising the array of capacitive sensors that form a stack with the array of ultrasonic transducers;
receive, from the capacitive sensor module, capacitances measured by the array of capacitive sensors;
determine a subset of the array of capacitive sensors for which degrees of change in the measured capacitances exceed a second threshold; and
identify a subset of the array of ultrasonic transducers based on the subset of the array of capacitive sensors;
based on the indication, configure the subset of the array of ultrasonic transducers to perform an ultrasonic sensing operation on the object;
obtain, from the subset of the array of ultrasonic transducers, an output of the ultrasonic sensing operation; and
perform an action based on the output of the ultrasonic sensing operation.

9. The apparatus of claim 8, wherein the array of capacitive sensors comprise an array of electrodes; and
wherein the capacitance measured by the capacitive sensor is between an electrode of the array of electrodes and ground.

10. The apparatus of claim 8, wherein the array of capacitive sensors comprise a first array of electrodes and a second array of electrodes; and
wherein the capacitance measured by the capacitive sensor is a mutual capacitance at an intersection point between a first electrode of the first array of electrodes and a second electrode of the second array of electrodes.

11. The apparatus of claim 8, wherein the capacitive sensor module is configured to generate the indication by sequentially scanning sensors in the array of capacitive sensors, according to a scanning pattern prioritizing locations likely to be touched by a user.

12. The apparatus of claim 8, wherein each of the array of ultrasonic transducers comprises an ultrasonic signal transmitter and an ultrasonic signal receiver; and
wherein configuring a subset of the array of ultrasonic transducers to perform a sensing operation of the object comprises the hardware processor being configured to:
configure the ultrasonic signal transmitters of the subset of the array of ultrasonic transducers to transmit ultrasonic signals;
configure the subset of the array of ultrasonic transducers to detect the ultrasonic signals reflected by the object; and
receive, from the subset of the array of ultrasonic transducers, detection outputs of the reflected ultrasonic signals.

13. The apparatus of claim 12, wherein the subset of the array of ultrasonic transducers is a first subset of the array of ultrasonic transducers;
wherein the hardware processor is further configured to execute the set of instructions to: disable a second subset of the array of ultrasonic transducers, or reduce a power level of the second subset of the array of ultrasonic transducers, when the first subset of the array of ultrasonic transducers perform the ultrasonic sensing operation.

14. The apparatus of claim 13, wherein the object comprises a finger; and
wherein the action comprises:
generating an image of the finger based on a distribution of signal strengths of reflected ultrasonic signals; and
transmitting the image to another component to enable the another component to compare the image with a reference image of a fingerprint to generate a comparison result, and to control access to a function of a device based on the comparison result.

15. A non-transitory computer readable medium storing a set of instructions that, when executed by a hardware processor, causes the hardware processor to:
receive an indication that an object is within a distance from an array of ultrasonic transducers, wherein the indication is generated based on a degree of change in a capacitance measured by a capacitive sensor of an array of capacitive sensors exceeding a first threshold and detecting that the object is within the distance from the array of capacitive sensors, wherein the indication is received from a capacitive sensor module comprising the array of capacitive sensors that form a stack with the array of ultrasonic transducers;
receive, from the capacitive sensor module, capacitances measured by the array of capacitive sensors;
determine a subset of the array of capacitive sensors for which degrees of change in the measured capacitances exceed a second threshold; and
identify a subset of the array of ultrasonic transducers based on the subset of the array of capacitive sensors;
based on the indication, configure the subset of the array of ultrasonic transducers to perform an ultrasonic sensing operation on the object;
obtain, from the subset of the array of ultrasonic transducers, an output of the ultrasonic sensing operation; and
perform an action based on the output of the ultrasonic sensing operation.

16. The non-transitory computer readable medium of claim 15, wherein the array of capacitive sensors comprise an array of electrodes; and
wherein the capacitance measured by the capacitive sensor is between an electrode of the array of electrodes and ground.

17. The non-transitory computer readable medium of claim 15, wherein the array of capacitive sensors comprise a first array of electrodes and a second array of electrodes; and
wherein the capacitance measured by the capacitive sensor is a mutual capacitance at an intersection point between a first electrode of the first array of electrodes and a second electrode of the second array of electrodes.

18. The non-transitory computer readable medium of claim 15, wherein the indication is generated by the capacitive sensor module by sequentially scanning sensors in the array of capacitive sensors, according to a scanning pattern prioritizing locations likely to be touched by a user.

19. The non-transitory computer readable medium of claim 15, wherein each of the array of ultrasonic transducers comprises an ultrasonic signal transmitter and an ultrasonic signal receiver; and
  wherein the non-transitory computer readable medium further comprises instructions that, when executed by the hardware processor, causes the hardware processor to:
    configure the ultrasonic signal transmitters of the subset of the array of ultrasonic transducers to transmit ultrasonic signals;
    configure the subset of the array of ultrasonic transducers to detect the ultrasonic signals reflected by the object; and
    receive, from the subset of the array of ultrasonic transducers, detection outputs of the reflected ultrasonic signals.

20. The non-transitory computer readable medium of claim 19, wherein the subset of the array of ultrasonic transducers is a first subset of the array of ultrasonic transducers;
  wherein the non-transitory computer readable medium further comprises instructions that, when executed by the hardware processor, causes the hardware processor to: disable a second subset of the array of ultrasonic transducers, or reduce a power level of the second subset of the array of ultrasonic transducers, when the first subset of the array of ultrasonic transducers perform the ultrasonic sensing operation;
  wherein the object comprises a finger; and
  wherein the action comprises:
    generating an image of the finger based on a distribution of signal strengths of reflected ultrasonic signals; and
    transmitting the image to another component to enable the another component to compare the image with a reference image of a fingerprint to generate a comparison result, and to control access to a function of a device based on the comparison result.

* * * * *